(12) United States Patent
Di Bernardo et al.

(10) Patent No.: US 8,213,749 B2
(45) Date of Patent: *Jul. 3, 2012

(54) SYSTEM AND METHOD FOR CREATING, STORING AND UTILIZING IMAGES OF A GEOGRAPHIC LOCATION

(75) Inventors: Enrico Di Bernardo, Pasadena, CA (US); Luis F. Goncalves, South Pasadena, CA (US)

(73) Assignee: Verderi, LLC, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,338

(22) Filed: Sep. 17, 2010

(65) Prior Publication Data

US 2011/0063432 A1    Mar. 17, 2011

Related U.S. Application Data

(60) Continuation of application No. 12/482,284, filed on Jun. 10, 2009, now Pat. No. 7,813,596, and a continuation of application No. 12/482,314, filed on Jun. 10, 2009, now Pat. No. 7,805,025, said application No. 12/482,284 is a continuation of application No. 11/761,361, filed on Jun. 11, 2007, now Pat. No. 7,577,316, said application No. 12/482,314 is a continuation of application No. 11/761,361, filed on Jun. 11, 2007, now Pat. No. 7,577,316, which is a continuation of application No. 11/130,004, filed on May 16, 2005, now Pat. No. 7,239,760, which is a division of application No. 09/758,717, filed on Jan. 11, 2001, now Pat. No. 6,895,126.

(60) Provisional application No. 60/238,490, filed on Oct. 6, 2000.

(51) Int. Cl.
*G06K 9/60* (2006.01)
*G08G 1/123* (2006.01)
*H04N 7/00* (2006.01)
*G01C 21/00* (2006.01)

(52) U.S. Cl. ............... 382/305; 340/995.1; 348/113; 701/207

(58) Field of Classification Search ............... 382/104, 382/113, 291, 305, 312; 715/850, 851, 854, 715/855; 701/200–215; 340/995.1–995.26; 342/357.12, 357.13, 357.21, 357.22; 370/316; 348/113, 116

See application file for complete search history.

(56) References Cited

U.S. PATENT DOCUMENTS 4,796,191 A    1/1989 Honey et al.
(Continued)

FOREIGN PATENT DOCUMENTS

EP    0473310 A2    3/1992
(Continued)

OTHER PUBLICATIONS

Lin-Eftekhar, Judy, "Virtual Los Angeles Today—A Virtual World Tomorrow" Article, Quest, 2000, pp. 4-8, 40.

(Continued)

*Primary Examiner* — Kanjibhai Patel
(74) *Attorney, Agent, or Firm* — Christie, Parker & Hale, LLP

(57) ABSTRACT

A system and method synthesizing images of a locale to generate a composite image that provide a panoramic view of the locale. A video camera moves along a street recording images of objects along the street. A GPS receiver and inertial navigation system provide the position of the camera as the images are being recorded. The images are indexed with the position data provided by the GPS receiver and inertial navigation system. The composite image is created on a column-by-column basis by determining which of the acquired images contains the desired pixel column, extracting the pixels associated with the column, and stacking the columns side by side. The composite images are stored in an image database and associated with a street name and number range of the street being depicted in the image. The image database covers a substantial amount of a geographic area allowing a user to visually navigate the area from a user terminal.

9 Claims, 18 Drawing Sheets

U.S. PATENT DOCUMENTS

| | | | |
|---|---|---|---|
| 5,259,037 A | 11/1993 | Plunk | |
| 5,381,338 A | 1/1995 | Wysocki et al. | |
| 5,517,419 A | 5/1996 | Lanckton et al. | |
| 5,563,650 A | 10/1996 | Poelstra | |
| 5,633,946 A | 5/1997 | Lachinski et al. | |
| 5,636,122 A | 6/1997 | Shah et al. | |
| 5,668,739 A | 9/1997 | League et al. | |
| 5,745,126 A | 4/1998 | Jain et al. | |
| 5,751,228 A | 5/1998 | Kamiya et al. | |
| 5,802,492 A | 9/1998 | DeLorme et al. | |
| 5,815,411 A | 9/1998 | Ellenby et al. | |
| 5,884,218 A | 3/1999 | Nimura et al. | |
| 5,898,680 A | 4/1999 | Johnstone et al. | |
| 5,908,465 A | 6/1999 | Ito et al. | |
| 5,926,116 A | 7/1999 | Kitano et al. | |
| 5,926,118 A | 7/1999 | Hayashida et al. | |
| 5,953,722 A * | 9/1999 | Lampert et al. | 1/1 |
| 5,961,571 A | 10/1999 | Gorr et al. | |
| 5,968,109 A | 10/1999 | Israni et al. | |
| 5,983,158 A | 11/1999 | Suzuki et al. | |
| 6,005,611 A | 12/1999 | Gullichsen et al. | |
| 6,009,188 A | 12/1999 | Cohen et al. | |
| 6,009,403 A | 12/1999 | Sato | |
| 6,023,241 A | 2/2000 | Clapper | |
| 6,032,098 A | 2/2000 | Takahashi et al. | |
| 6,035,253 A | 3/2000 | Hayashi et al. | |
| 6,081,206 A | 6/2000 | Kielland | |
| 6,092,076 A * | 7/2000 | McDonough et al. | 1/1 |
| 6,097,394 A | 8/2000 | Levoy et al. | |
| 6,125,326 A | 9/2000 | Ohmura et al. | |
| 6,125,356 A | 9/2000 | Brockman et al. | |
| 6,133,947 A | 10/2000 | Mikuni | |
| 6,140,943 A | 10/2000 | Levine | |
| 6,144,318 A | 11/2000 | Hayashi et al. | |
| 6,163,749 A * | 12/2000 | McDonough et al. | 701/208 |
| 6,182,010 B1 | 1/2001 | Berstis | |
| 6,191,704 B1 | 2/2001 | Takenaga et al. | |
| 6,195,122 B1 | 2/2001 | Vincent | |
| 6,199,014 B1 | 3/2001 | Walker et al. | |
| 6,208,353 B1 | 3/2001 | Ayer et al. | |
| 6,222,555 B1 | 4/2001 | Christofferson et al. | |
| 6,226,591 B1 | 5/2001 | Okumura et al. | |
| 6,233,523 B1 | 5/2001 | Sood | |
| 6,233,591 B1 | 5/2001 | Sherman et al. | |
| 6,282,362 B1 | 8/2001 | Murphy et al. | |
| 6,282,363 B1 | 8/2001 | Yagi et al. | |
| 6,285,317 B1 | 9/2001 | Ong | |
| 6,285,952 B1 | 9/2001 | Kim | |
| 6,308,177 B1 | 10/2001 | Israni et al. | |
| 6,317,127 B1 | 11/2001 | Daily et al. | |
| 6,317,605 B1 | 11/2001 | Sakuma | |
| 6,321,158 B1 | 11/2001 | DeLorme et al. | |
| 6,327,533 B1 | 12/2001 | Chou | |
| 6,335,754 B1 | 1/2002 | Endo et al. | |
| 6,351,706 B1 | 2/2002 | Morimoto et al. | |
| 6,351,710 B1 | 2/2002 | Mays | |
| 6,356,297 B1 | 3/2002 | Cheng et al. | |
| 6,381,603 B1 | 4/2002 | Chan et al. | |
| 6,393,149 B2 * | 5/2002 | Friederich et al. | 382/173 |
| 6,415,227 B1 | 7/2002 | Lin | |
| 6,417,786 B2 | 7/2002 | Learman et al. | |
| 6,486,908 B1 | 11/2002 | Chen et al. | |
| 6,487,495 B1 | 11/2002 | Gale et al. | |
| 6,496,842 B1 | 12/2002 | Lyness | |
| 6,525,768 B2 | 2/2003 | Obradovich | |
| 6,535,210 B1 | 3/2003 | Ellenby et al. | |
| 6,542,813 B1 | 4/2003 | Kovacs | |
| 6,552,744 B2 | 4/2003 | Chen | |
| 6,553,308 B1 | 4/2003 | Uhlmann et al. | |
| 6,563,529 B1 | 5/2003 | Jongerius | |
| 6,587,787 B1 * | 7/2003 | Yokota | 701/212 |
| 6,600,990 B2 | 7/2003 | Takenaga | |
| 6,606,034 B1 | 8/2003 | Muller et al. | |
| 6,609,005 B1 | 8/2003 | Chern | |
| 6,621,423 B1 | 9/2003 | Cooper et al. | |
| 6,674,434 B1 | 1/2004 | Chojnacki et al. | |
| 6,680,694 B1 | 1/2004 | Knockeart et al. | |
| 9,707,421 | 3/2004 | Drury et al. | |
| 9,741,790 | 5/2004 | Burgess | |
| 6,775,614 B2 | 8/2004 | Kim | |
| 6,798,923 B1 | 9/2004 | Hsieh et al. | |
| 6,819,318 B1 | 11/2004 | Geng | |
| 6,847,889 B2 | 1/2005 | Park et al. | |
| 6,895,126 B2 | 5/2005 | Di Bernardo et al. | |
| 6,950,535 B2 | 9/2005 | Sibayama et al. | |
| 6,967,651 B2 | 11/2005 | Endoh et al. | |
| 6,977,630 B1 | 12/2005 | Donath et al. | |
| 6,992,583 B2 | 1/2006 | Muramatsu | |
| 7,139,983 B2 | 11/2006 | Kelts | |
| 7,233,691 B2 | 6/2007 | Setterholm | |
| 7,366,522 B2 | 4/2008 | Thomas | |
| 7,466,336 B2 | 12/2008 | Regan et al. | |
| 7,499,586 B2 | 3/2009 | Agarwala et al. | |
| 7,634,465 B2 | 12/2009 | Sareen et al. | |
| 7,840,032 B2 | 11/2010 | Ofek | |
| RE42,289 E | 4/2011 | Vincent | |
| 2002/0140988 A1 | 10/2002 | Cheatle et al. | |
| 2003/0128182 A1 | 7/2003 | Donath et al. | |
| 2004/0169653 A1 | 9/2004 | Endo et al. | |
| 2004/0257375 A1 | 12/2004 | Cowperthwaite | |
| 2004/0264763 A1 | 12/2004 | Mas et al. | |
| 2005/0113994 A1 | 5/2005 | Bell et al. | |
| 2005/0216186 A1 | 9/2005 | Dorfman et al. | |
| 2006/0063599 A1 | 3/2006 | Greenspan | |
| 2006/0075442 A1 | 4/2006 | Meadow | |
| 2006/0077493 A1 | 4/2006 | Kita et al. | |
| 2006/0271287 A1 | 11/2006 | Gold et al. | |
| 2007/0002057 A1 | 1/2007 | Danzig et al. | |
| 2008/0043020 A1 | 2/2008 | Snow et al. | |

FOREIGN PATENT DOCUMENTS

| | | |
|---|---|---|
| GB | 2337653 A | 11/1999 |
| JP | 63-79478 | 4/1988 |
| WO | WO 97-23096 | 6/1997 |
| WO | WO 00-79785 | 12/2000 |

OTHER PUBLICATIONS

Reyes, David, "Orange County Freezes Ambitious Aerial Photography Project" Article, Los Angeles Times Newspaper, Metro Section, Oct. 16, 2000, pp. B1, B5.

Andrew Lippman, "Movie Maps An Application of the Optical Video-disc to Computer Graphic", ACM SIGGRAPH Computer Graphics, vol. 14, No. 3, Association for Computing Machinery, New York NY, USA, Jul. 1980 (10 pages).

Steven Yelick, "Anamorphic Image Processing", Thesis (B.S) Massachusetts Institute of Technology, Dept. of Electrical Engineering and Computer Science, Massachusetts Institute of Technology, Cambridge, MA, USA, Sep. 1980 (56 pages).

Walter Bender, "Computer Animation Via Optical Video Disc", Thesis (M.S.V.S) Massachusetts Institute of Technology, Dep. of Architecture, Massachusetts Institute of Technology, Cambridge, MA, USA, Sep. 1980 (45 pages).

Robert Mohl, "Cognitive Space in the Interactive Movie Map: an Investigation of Spatial Learning in Virtual Environments", Thesis (Ph.D) Massachusetts Institute of Technology, Dept. of Architecture, Massachusetts Institute of Technology, Cambridge, MA, USA, 1981 (227 pages).

"Interactive Movie Map", Video, pepared in connection with Aspen Movie Map project at Massachusetts Institute of Technology, available at http://www.media.mit.edu/speech/sig_videos.html and enclosed on DVD, 1981.

Hiroshi Kawasaki, Tomoyuki Yatabe, Katsushi Ikeuchi, Masao Sakauchi, "Automatic Modeling of a 3D City Map from Real-World Video", Proceedings of the seventh ACM international conference on Multimedia, Association for Computing Machinery, New York, NY, USA, 1999 (8 pages).

Takuji Takahashi, Hiroshi Kawasaki, Katsushi Ikechi, Masao Sakauchi, "Arbitrary View Position and Direction Rendering for Large-Scale Scenes", Conference Paper Computer Vision and Pattern Recognition 2000: IEEE Conference on Computer Vision and Pattern Recognition, Institution of Electrical Engineers, Hilton Head Island, SC, USA, Jul. 13, 2000 (8 pages).

Al-Kodmany, "Using Web-Based Technologies and Geographic Information Systems in Community Planning," The Society of Urban Technology, 2000, vol. #1, pp. 1-30.
Article list produced by defendant in *Vederi, LLC v. Google, Inc.*; Civil Action No. CV10-07747, the listed articles bear dates between 1992 and 1996, with some listed articles bearing no dates, 4 pgs.
Bates-Brkljac, et al., "Issues in Participative Use of an Historic City Millennial Web Site," IEEE, 2000, pp. 119-125.
City of Boca Raton Sign and Signal Inventory Proposal, Geospan Corporation Confidential, Sep. 19, 2000, pp. 1-14.
City Tour, User Guide and Tutorial by Geospan Corporation, 1996, 114 pgs.
City Tour Evaluation and Unisys Computer System Access Agreement, (Agreement No. 96-3526 C), Sep. 20, 1996.
City Tour Evaluation and Unisys Computer System Access Agreement, (Agreement No. 96-3643 C), Jun. 7, 1996.
Deposition Transcript of Geospan Corporation in *Vederi, LLC v. Google, Inc.*; Civil Action No. CV10-07747, 90 pgs.
Drive around town on your PC with GEOVISTA Visual Geographic Information, undated, 6 pgs.
Dykes, et al., "Scripting Dynamic Maps: Some Examples and Experiences with Tcl/Tk," Multimedia Cartography (1999), 12 pgs.
Dykes, "An Approach to Virtual Environments for Visualization Using Linked Geo-Referenced Panoramic Imagery," Computers, Environment and Urban Systems 24 (2000), Elsevier Science Ltd., pp. 127-152.
Endo, et al., "Image-Based Walk-Through System for Large-Scale Scenes," (1998), 6 pgs.
Freundlich, "Why Videomobiles are Roaming the Streets of America," Business Week, Developments to Watch, No. 3293, Nov. 16, 1992.
"Geospan's Electric Street Maps'" Green Car Journal, Aug. 1992, vol. 1, No. 8, ISSN 1059-6143, 1 pg.
"Geospan's Video Maps," IDP Report—Information and Data Base Publishing Report, Dec. 18, 1992, vol. 13, No. 46.
Geospan Corporation brochure, Visual Geographic Information, 1995, 3 pgs.
GeoVISTA License Agreement for GeoSTAR Rental Program, and GeoVISTA License Terms and Conditions, Oct. 22, 1993, 2 pgs.
"Geovista Lets You Drive Around Town on Your PC," Inside Real Estate, Nov. 1995 vol. 1, No. 13, 1 pg.
Geovista Production Processing Design Document, Aug. 26, 2011, 16 pgs.
Gibbons (Editor), "Melds GPS, GIS, Videography GeoSpan Visualizes Digital Mapping," GPS World Newsletter, vol. 2, No. 15, Aug. 6, 1992, 1 pg.
"GPS Van Captures Curb Appeal Virtual Reality Sells Real Estate," Maps Alive, Mar. 1995, p. 8, 3 pgs.
Halverson, "A Company Tries to Map Every Block in America," The Christian Science Monitor, Monday, Nov. 9, 1992, 1 pg.
Hirose, et al., "Generation of Wide-Range Virtual Spaces Using Photographic Images," IEEE, (1998), 8 pgs.
Image Management System (Version 2.02)—User Reference to Cook County PIC Application, GEOSPAN Corporation, Jul. 24, 2000, 33 pgs.
Ishida, et al., "Digital City Kyoto: Towards a Social Information Structure," (1999), 13 pgs.
Kaeter, "Emerging Companies," Twin Cities Business Monthly, Jun. 1995, 2 pgs.
Kurschner, et al., "Ford Explorers," Minneapolis St. Paul City Business, The Business Journal, Everybody's Business, vol. 10, No. 33, Jan. 22-28, 1993, 1 pg.
Licensee Information, American Family Insurance, GEOSPAN Corporation GEOVISTA™ License Agreement, Jan. 1997, 4 pgs.
Licensee Information, Kate McGuire, Geospan Corporation Terms and Conditions for Single User Software and Data License Agreement, Nov. 1995, 7 pgs.
Licensee Information, West Bend Mutual Insurance Company, GEOSPAN™ Corporation GEPVISTA License Agreement, Jul. 1997, 4 pgs.
Lippman, "MovieMaps: An Application of the Optical Videodisc to Computer Graphics," ACM, (1980), 11 pgs.

"Look! Out There on the Road!," American Gas, vol. 74, No. 11, Nov. 1992, 1 pg.
MicroSoftware News, For Local Governments, vol. 9, No. 11, Nov. 1992, 1 pg.
"New Products," Planning, Sep. 1992, 1 pg.
Preliminary Invalidity Contentions by Google in *Vederi, LLC v. Google, Inc.*, Case No. CV10-07747, 679 pgs.
Proposed Data Structures for Tables in the VGI System—Data Field List, Table Structures for Cook III System, Aug. 26, 2011, pp. 1-17.
Robinson, Exciting New Technologies for Creating Accurate IVHS Databases, GeoVAN™ High Productivity Mobile Data Collection System, undated, 1 pg.
Shiffer, "Augmenting Geographic Information with Collaborative Multimedia Technologies," American Congress on Surveying and Mapping, (1993), pp. 367-376.
United States Postal Service Current, Accurate, and Complete Geographic Database, Unsolicited Proposal Submitted by Geospan Corporation, 110 pgs.
Various videos relating to Geospan Corporation bearing dates between 1992 and 1995, with some videos bearing no dates, produced by defendant in *Vederi, LLC v. Google, Inc.*, Case No. CV10-07747, enclosed on DVD.
Yee, "GPS & Video Data Collection in Los Angeles County—A Status Report," IEEE, (1994), 6 pgs.
Google's Opening Claim Construction Brief in *Vederi, LLC v. Google, Inc.*, Case No. CV10-07747 AK (CWx), Filed Oct. 4, 2011, 33 pgs.
Declaration of Dr. John R. Grindon in Support of Google's Opening Claim Construction Brief in *Vederi, LLC v. Google, Inc.*, Case No. CV10-07747 AK (CWx), Filed Oct. 4, 2011, 48 pgs.
Declaration of Sasha G. Rao in Support of Google's Opening Claim Construction Brief in *Vederi, LLC v. Google, Inc.*, Case No. CV10-07747 AK (CWx), Filed Oct. 4, 2011, 319 pgs.
Plaintiff Vederi, LLC's Opening Claim Construction Brief in *Vederi, LLC v. Google, Inc.*, Case No. CV10-07747-AK (CWx), Filed OCt. 4, 2011, 54 pgs.
Declaration of Steven E. Lauridsen in Support of Plaintiff Vederi, LLC's Opening Claim Construction Brief in *Vederi, LLC v. Google, Inc.*, Case No. CV10-07747-MRP [sic] (CWx), Filed Oct. 4, 2011, 19 pgs.
Declaiation of Luis Goncalves in Support of Plaintiff Vederi, LLC's Opening Claim Construction Brief in *Vederi, LLC v. Google, Inc.*, Case No. CV10-07747-MRP [sic] (CWx), Filed Oct. 4, 2011, 3 pgs.
Plaintiff Vederi, LLC's Responsive Claim Construction Brief in Vede*Vederi, LLC v. Google, Inc.*, Case No. CV10-07747-MRP [sic] (CWx), Filed Oct. 25, 2011, 31 pgs.
Declaration of Luis Goncalves in Support of Plaintiff Vederi, LLC's Responsive Claim Construction Brief in *Vederi, LLC v. Google, Inc.*, Case No. CV10-07747-MRP [sic] (CWx), Filed Oct. 25, 2011, 31 pgs.
Google's Answering Claim Construction Brief in *Vederi, LLC v. Google, Inc.*, Case No. CV10- 07747-AK (CWx), Filed Oct. 25, 2011, 28 pgs.
Supplemental Declaration of Dr. John R. Grindon in Support of Google's Answering Claim Construction Brief in *Vederi, LLC v. Google, Inc.*, Case No. CV10-07747-AK (CWx), Filed OCt. 25, 2011, 9 pgs.
Declaration of Sasha G. Rao in Support of Google's Answering Claim Construction Brief in *Vederi, LLC v. Google, Inc.*, Case No. CV10-07747-AK (CWx), Filed OCt. 25, 2011, 37 pgs.
Civil Minutes-General, U.S. District Court Central District of California, *Vederi, LLC v. Google, Inc., et al.*, Case No. LA10CV07747-AK (FMOx), Nov. 22, 2011, 1 pg.
Reporter's Transcript of Proceedings, Pasadena, California, Tuesday, Nov. 22, 2011 in *Vederi, LLC v. Google, Inc.*, Case No. CV10-7747 AK, 129 pgs.
A Visualization of the MIT City Scanning Project, (1998), Tara Schenkel, Massachusetts Institute of Technology, (77 pgs.).
Abbott, Land-vehicle Navigation using GPS, (1999), Proceedings of IEEE, 87(1) pp. 145-162, (18 pgs.).
Bink.nu/Windows Live, Local, Offers Street-Side Level Imagery! Last viewed, Jun. 25, 2006, (4 pgs.).

Building a photo-realistic virtual world using view-dependent images and models, (1999), Tomohiro Tanikawa et al., IEEE, (6 pgs).
Car Navigation System—Car Domain; last viewed Jun. 25, 2006, (2 pgs.).
Cheung, Dennis T., A9 Maps—Now with Block View—Virtual Tour; Jun. 30, 2005, (10 pgs.).
Children's use of mouse-based interfaces to control virtual travel, (1994), Erik Strommen, ACM, (6 pgs.).
Cybercity Walker—Layered Morphing Method—, Takaaki Endo et al., (5 pgs.).
Elements of Realspace Imaging: A Proposed Taxonomy, (1991), Michael Naimark, SPIE/SPSE Electronic Imaging Proceedings, (14 pgs.).
Fanous, Emad, Yahoo also provides Map API and A9 creates their own Maps; Jun. 30, 2005, (7 pgs.).
Field Recording Studies, (1996), Michael Naimark, MIT Press, (4 pgs.).
Final Office Action mailed Nov. 20, 2009 re U.S. Appl. No. 11/465,500, (15 pgs.).
Generating Dynamic Projection Images for Scene Representation and Understanding, (1998), Jiang Yu Zheng et al., Academic Press, (20 pgs.).
Hanselman, Scott, More Interesting Maps; Scott Hanselman's Computer Zen, Aug. 23, 2005, (3 pgs.).
Hanspeter A. Mallot, et al., View-based vs. Place-based navigation: What is recognized in recognition triggered response?, (1998), ECVP, (12 pgs.).
Image-Based Psuedo 3D Visualization of Real Space of WWW, (2000), Masahiko Tsukamoto, Springer-Verlag, (21 pgs.).
Image-Based Virtual World Generation, (1997), Michitaka Hirose, IEEE, (7 pgs.).
Interactive City Planning Using Multimedia Representation Aids, (1995), Michael Shiffer, ACM, (2 pgs.).
Interface and New Interactive Systems, Brenda Laurel, (13 pgs.).
Jiang Yu Zheng, et al., Scanning and Rendering Scene Tunnels for Virtual City Traversing, (2004), ACM, (8 pgs.).
Jiang Yu Zheng, et al., Panoramic Representation of Scenes for Route Understanding, (1990), IEEE, (7 pgs.).
Leung, Component-based Car Detection in Street Scene Images, (2004), MIT, (71 pgs.).
Management of Large Amounts of Data in Interactive Building Walkthroughs, (1992), Thomas Funkhouser et al., ACM, (11 pgs.).
Marsmap: An Interactive Virtual Reality Model of the Pathfinder Landing Site, C. Stoker et al., (2 pgs.).

New Techniques for Data Collection and Integration for RTI/IVHS, (1991), Richard Harris et al., IEEE, (8 pgs.).
Non-final Office Action mailed Mar. 10, 2009 in U.S. Appl. No. 11/465,500, (17 pgs.).
Notice of Allowance in U.S. Appl. No. 11/323,241 mailed Jan. 2, 2009, (9 pgs.).
Panoramic Representation for Route Recognition by a Mobile Robot, (1992), Jiang Yu Zheng, et al., Kluwer Academic Publishers, (22 pgs.).
Punvatayungkour, et al., Three Line Scanner Imagery and On-Street Packed Vehicle Detection, (2004), Proceedings of the $20^{th}$ ISPRS Congress, (5 pgs.).
Quicktime VR Sample, (3 pgs.).
Quicktime® VR—An Image-Based Approach to Virtual Environment Navigation, (1995), Shenchang Chen, ACM, Inc., (10 pgs.).
Spacecode Camera, (1986) Michael Naimark, (5 pgs.).
Taking Online Maps Down to Street Level, 2007, Luc Vincent, IEEE Computer Magazine, (3 pgs.).
The London Travel Demonstrator, (1999), Anthony Steed et al., ACM, (8 pgs.).
The Potential of Web-Based Mapping and Virtual Realty Technologies for Modelling Urban Environments, (1998), Simon Doyle, et al., Elsevier Science Ltd., (19 pgs.).
The Virtual Museum: Interactive 3D Navigation of a Multimedia Database, (1992), Gavin Miller et al., John Wiley & Sons, Ltd., (15 pgs.).
Town digitizing: Recording of street views by using omnidirectional vision sensors, (2000), Koji Kato et al., IEEE, (6 pgs.).
Virtual Los Angeles Today—A Virtual World Tomorrow, (2000), Judy Lin-Eftekhar, Quest, (6 pgs.).
Virtual Navigation of Complex Scenes using Clusters of Cylindrical Panoramic Images, (1997), Sing Bing Kang et al., Digital Equipment Corporation, (28 pgs.).
Visualizing the City: Communicating Urban Design to Planners and Decision-Makers, (2000), Michael Batty et al., CASA, UCL—Centre for Advanced Spatial Analysis, University College London, (38 pgs.).
Wayfinding/Navigation within a QTVR Virtual Environment: Preliminary Results, (1999), Brian Norris et al., IOS Press on behalf of the IFIP-International Federation for Information Processing, (8 pgs.).
Written Opinion dated Mar. 12, 2007 for PCT Application PCT/US2006/038876, (4 pgs.).

* cited by examiner

| Segment ID 172 | Street Name 174 | Side of Street with Respect to Hub 176 | End Point Coordinates 178 | Segments Adjacent to From Coordinates 180 | Segments Adjacent to To Coordinates 182 | Distance from Hub 184 | Length of Trajectory Segment 186 | Offset 188 |
|---|---|---|---|---|---|---|---|---|
| 1 | Colorado Boulevard | West | (10, 10), (50, 10) | 2(N) 4(S) 3(W) 1(E) | 5(N) 7(S) 1(W) 6(E) | (120m, 122m) | (28m, 30m) | (2,0) |
| 6 | Colorado Boulevard | West | (50, 10) (65, 10) | 5(N) 7(S) 1(W) 6(E) | 8(W) 10(S) 6(W) 9(E) | (130m, 134m) | (20m, 22m) | (0,0) |

Fig. 13

| Segment ID | Side Viewed | Distance of Center Position |
|---|---|---|
| 1 | Even | 8m |
| 2 | Odd | 8m |
| 1 | Even | 16m |

Fig. 14

| Block Label | Segment IDs |
|---|---|
| (50, 50) | 1, 4, 7, 9 |
| (50, 100) | 2, 5, 8, 10, 11 |

SYSTEM AND METHOD FOR CREATING, STORING AND UTILIZING IMAGES OF A GEOGRAPHIC LOCATION

CROSS-REFERENCE TO RELATED APPLICATIONS)

This application is a continuation application of U.S. application Ser. No. 12/482,284, filed on Jun. 10, 2009, now U.S. Pat. No. 7,813,596, and U.S. application Ser. No. 12/482,314, filed on Jun. 10, 2009 now U.S. Pat. No. 7,805,025, which are continuations of Ser. No. 11/761,361, filed Jun. 11, 2007, now U.S. Pat. No. 7,577,316, issued Aug. 18, 2009, which is a continuation of Ser. No. 11/130,004, filed May 16, 2005, now U.S. Pat. No. 7,239,760, issued Jul. 3, 2007, which is a divisional of Ser. No. 09/758,717, filed Jan. 11, 2001, now U.S. Pat. No. 6,895,126, issued May 17, 2005, which claims the benefit of U.S. provisional patent application No. 60/238,490, filed Oct. 6, 2000, the disclosures of all of which are hereby incorporated by reference in their entirety for all purposes.

FIELD OF THE INVENTION

This invention relates to visual databases, specifically to the creation and utilization of visual databases of geographic locations.

BACKGROUND OF THE INVENTION

There exist methods in the prior art for creating visual databases of geographic locations. However, such databases are of limited use due to the method of acquiring the imagery as well as the kind of imagery acquired. One particular method involves the taking of individual photographs of the location and electronically pasting the photographs on a polygonal mesh that provide the framework for a three-dimensional (3D) rendering of the location. This method, however, is time consuming and inefficient for creating large, comprehensive databases covering a substantial geographic area such as an entire city, state, or country.

Another method uses video technology to acquire the images. The use of video technology, especially digital video technology, allows the acquisition of the image data at a higher rate, reducing the cost involved in creating the image databases. For example, the prior art teaches the use of a vehicle equipped with a video camera and a Global Positioning System (GPS) to collect image and position data by driving through the location. The video images are later correlated to the GPS data for indexing the imagery. Nevertheless, such a system is still limited in its usefulness due to the lack of additional information on the imagery being depicted.

The nature of the acquired imagery also limits the usefulness of such a system. A single image acquired by the video camera contains a narrow field of view of a locale (e.g. a picture of a single store-front) due to the limited viewing angle of the video camera. This narrow field of view provides little context for the object/scene being viewed. Thus, a user of such an image database may find it difficult to orient himself or herself in the image, get familiar with the locale, and navigate through the database itself.

One way to increase the field of view is to use a shorter focal length for the video camera, but this introduces distortions in the acquired image. Another method is to increase the distance between the camera and the buildings being filmed. However, this may not be possible due to the limit on the width of the road and constructions on the opposite side of the street.

The prior art further teaches the dense sampling of images of an object/scene to provide different views of the object/scene. The sampling is generally done in two dimensions either within a plane, or on the surface of an imaginary sphere surrounding the object/scene. Such a sampling, however, is computationally intensive and hence cumbersome and inefficient in terms of time and cost.

Accordingly, there is a need for a system and method for creating a visual database of a comprehensive geographic area in a more time and cost efficient manner. Such a system should not require the reconstruction of 3D scene geometry nor the dense sampling of the locale in multiple dimensions. Furthermore, the images in the database should provide a wider field of view of a locale to provide context to the objects being depicted. The database should further correlate the images with additional information related to the geographic location and objects in the location to further enhance the viewing experience.

SUMMARY OF THE INVENTION

The present invention addresses and alleviates the above-mentioned deficiencies associated with the prior art. More particularly, the present invention is directed to a computer-implemented system and method for synthesizing images of a geographic location to generate composite images of the location. The geographic location may be a particular street in a geographic area with the composite images providing a view of the objects on each side of the street.

According to one aspect of the invention, an image recording device moves along a path recording images of objects along the path. A GPS receiver and/or inertial navigation system provides position information of the image recording device as the images are being acquired. The image and position information is provided to a computer to associate each image with the position information.

The computer synthesizes image data from the acquired images to create a composite image depicting a view of the objects from a particular location outside of the path. Preferably, the composite image provides a field of view of the location that is wider than the field of view provided by any single image acquired by the image recording device.

In another aspect of the invention, the path of the camera is partitioned into discrete segments. Each segment is preferably associated with multiple composite images where each composite image depicts a portion of the segment. The composite images and association information are then stored in an image database.

In yet another aspect of the invention, the image database contains substantially all of the static objects in the geographic area allowing a user to visually navigate the area from a user terminal. The system and method according to this aspect of the invention identifies a current location in the geographic area, retrieves an image corresponding to the current location, monitors a change of the current location in the geographic area, and retrieves an image corresponding to the changed location. A map of the location may also be displayed to the user along with information about the objects depicted in the image.

DESCRIPTION OF THE DRAWINGS

FIG. 13 is an illustration of an exemplary street segments table including street segments in a camera's trajectory;

FIG. 14 is an illustration of an exemplary image coordinates table for associating composite images with the street segments in the street segments table of FIG. 13;

FIG. 15 is an illustration of an exemplary segment block table for allowing an efficient determination of a segment that is closest to a particular geographic coordinate;

DETAILED DESCRIPTION OF THE INVENTION

Figure 1:
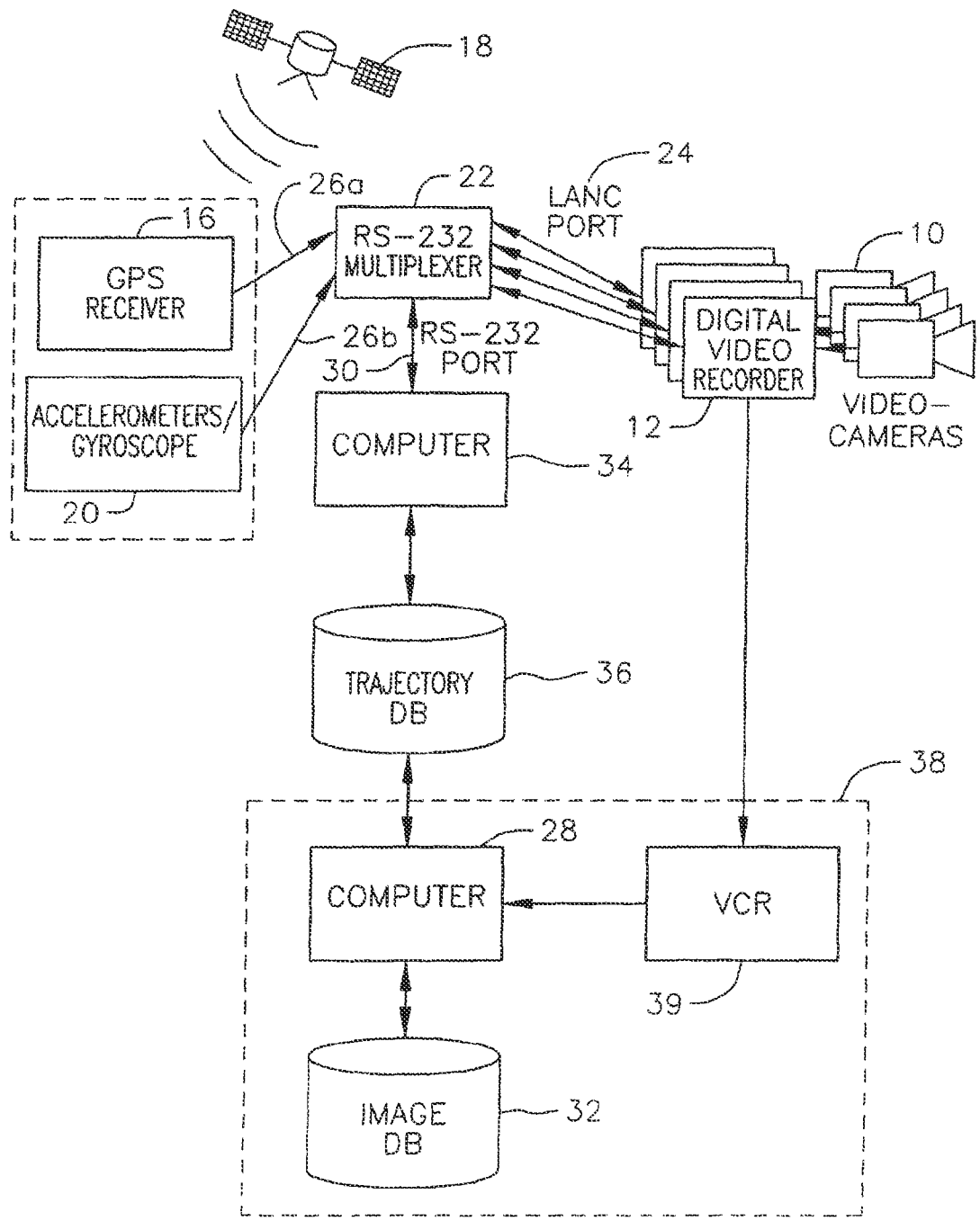
FIG. 1 is a schematic block diagram of a data acquisition and processing system for acquiring image and position data used to create composite images of a geographic location.

FIG. 1 is a schematic block diagram of a data acquisition and processing system for acquiring and processing image and position data used to create composite images of a geographic location. The composite images are created by synthesizing individual image frames acquired by a video camera moving through the location and filming the objects in its view. The composite images may depict on urban scene including the streets and structures of an entire city, state, or country. The composite images may also depict other locales such as a zoo, national park, or the inside of a museum, allowing a user to visually navigate the locale.

The data acquisition and processing system includes one or more image recording devices preferably taking the form of digital video cameras 10 moving along a trajectory/path and recording images on the trajectory on digital videotapes 12. Other types of acquisition devices may also be used in combination to, or in lieu of, the digital cameras 10, such as analog cameras. Furthermore, the video images may be recorded on optical, magnetic, pr silicon video tapes, or on any other known types of storage devices that allow random access of particular image frames and particular video pixels within the image frames.

The data acquisition and processing system further includes a UPS receiver 16 for receiving position information from a set of GPS satellites 18 as the cameras 10 move along the trajectory. An inertial navigation system 20 including one or more accelerometers and/or gyroscopes also provides position information to the data acquisition and processing system. When the inertial navigation system 20 is used in conjunction with the GPS receiver 16, a more accurate calculation of the position information may be produced.

In an alternative embodiment, position information is acquired using devices other than the inertial navigation system 20 and/or the GPS receiver 16, such as via computer-vision-based algorithms that compute positions using video information from the video cameras 10.

The video cameras 10 provide to a multiplexer 22 a frame number and time information for each image acquired via a communication link 24 preferably taking the form of a LANC™ port. The UPS receiver 16 and inertial navigation system 20 also provide position information to the multiplexer 22 via communication links 26a, 26b, preferably taking the form of RS-232 ports. The multiplexer 22 in turn transmits the received frame number, time information, and position data to a data acquisition computer 34 via a communication link 30, which also preferably takes the form of an RS-232 port. The computer 34 stores in a trajectory database 36 the position data from the GPS receiver 16 and/or inertial navigation system 20 along with the frame number and time information from the video cameras 10. This information is then used by a post-processing system 38 to create the composite images.

The post-processing system 38 preferably includes a post-processing computer 28 in communication with a video player 39. The computer 28 preferably includes a video acquisition card for acquiring and storing the image sequences as the video player 39 plays the videotapes 12 of the acquired images. The computer 28 includes a processor (not shown) programmed with instructions to take the image and position data and create one or more composite images for storing into an image database 32. The image database 32 is preferably a relational database that resides in a mass storage device taking the form of a hard disk drive or drive array. The mass storage device may be part of the computer 28 or a separate database server in communication with the computer.

In an alternative embodiment, the images are transferred directly to the data acquisition computer 34 as the images are being recorded. In this scenario, the computer 34 is preferably equipped with the video acquisition card and includes sufficient storage space for storing the acquired images. In this embodiment, the data acquisition computer 34 preferably contains program instructions to create the composite images from the acquired images.

In general terms, a composite image of a particular geographic location is created by using at least one video camera 10 recording a series of video images of the location while moving along a path. In the one camera scenario, the camera 10 is moved twice on the same path but in opposite directions to film the objects on both sides of the path. Movement to the camera 10 is provided by a base, platform, or motor vehicle moving at an average speed of preferably about 20 miles/hour to ensure a sufficient resolution in the resulting images. Video cameras with higher sampler rates may allow for faster acquisition speeds.

Preferably, the data acquisition and processing system uses four cameras 10 mounted on top of a moving motor vehicle. Two side cameras face each side of the path for filming objects viewed from the each side of the vehicle. A front and back cameras allow the filming of the objects viewed from the front and back of the vehicle. The front and back cameras may be equipped with fish-eye lens for providing a wide-angle view of the path. A person skilled in the art should recognize, however, that additional cameras may be used to film the objects from different viewing directions. For example, a dodecahedron of cameras may be used to record the objects from all viewing directions. Furthermore, the side cameras need not face directly to the side of the street, but may face a slightly forward or backward direction to provide a look up or down of the path.

As the images acquired by the cameras 10 are recorded on the videotapes 12, the frame number and time associated with the images are transferred to the data acquisition computer 34. The images recorded on the videotapes 12 are later transferred to the post-processing computer 28 for further processing. Once the images are received, the computer 28 stores the image data in its memory in its original form or as a compressed file using one of various well-known compression schemes, such as MPEG.

As the camera 10 moves along the path and records the objects in its view, the GPS receiver 16 computes latitude and longitude coordinates using the information received from the set of GPS satellites 18 at selected time intervals (e.g. one sample every two seconds). The latitude and longitude coordinates indicate the position of the camera 10 during the recording of a particular image frame. The GPS satellite 18 also transmits to the GPS receiver 16 a Universal Time Coordinate (UTC) time of when the coordinates were acquired. The GPS receiver 16 is preferably located on the vehicle transporting the camera 10 or on the camera itself. The GPS data with the position sequences and UTC time information is then transferred to the computer 34 for storing in the trajectory database 36.

In addition to the position information provided by the OPS receiver 16, the inertial navigation system 20 also provides acceleration information to the computer 34 for independently deriving the position sequence of the camera 10. Specifically, the one or more accelerators and gyroscopes in the inertial navigation system 20 monitor the linear and rotational acceleration rates of the camera 10 and transfer the acceleration data to the computer 34. The computer 34 integrates the acceleration data to obtain the position of the camera 10 as a function of time. The computer 34 preferably combines the position derived from the acceleration information with the GPS position data to produce a more accurate evaluation of the position of the camera 10 at particular instances in time.

The postprocessing computer 28 uses the image and position sequences to synthesize the acquired images and create composite images of the location that was filmed. The composite images preferably provide a wider field of view of the location than any single image frame acquired by the camera 10. In essence, the composite images help provide a panoramic view of the location.

Figure 2:
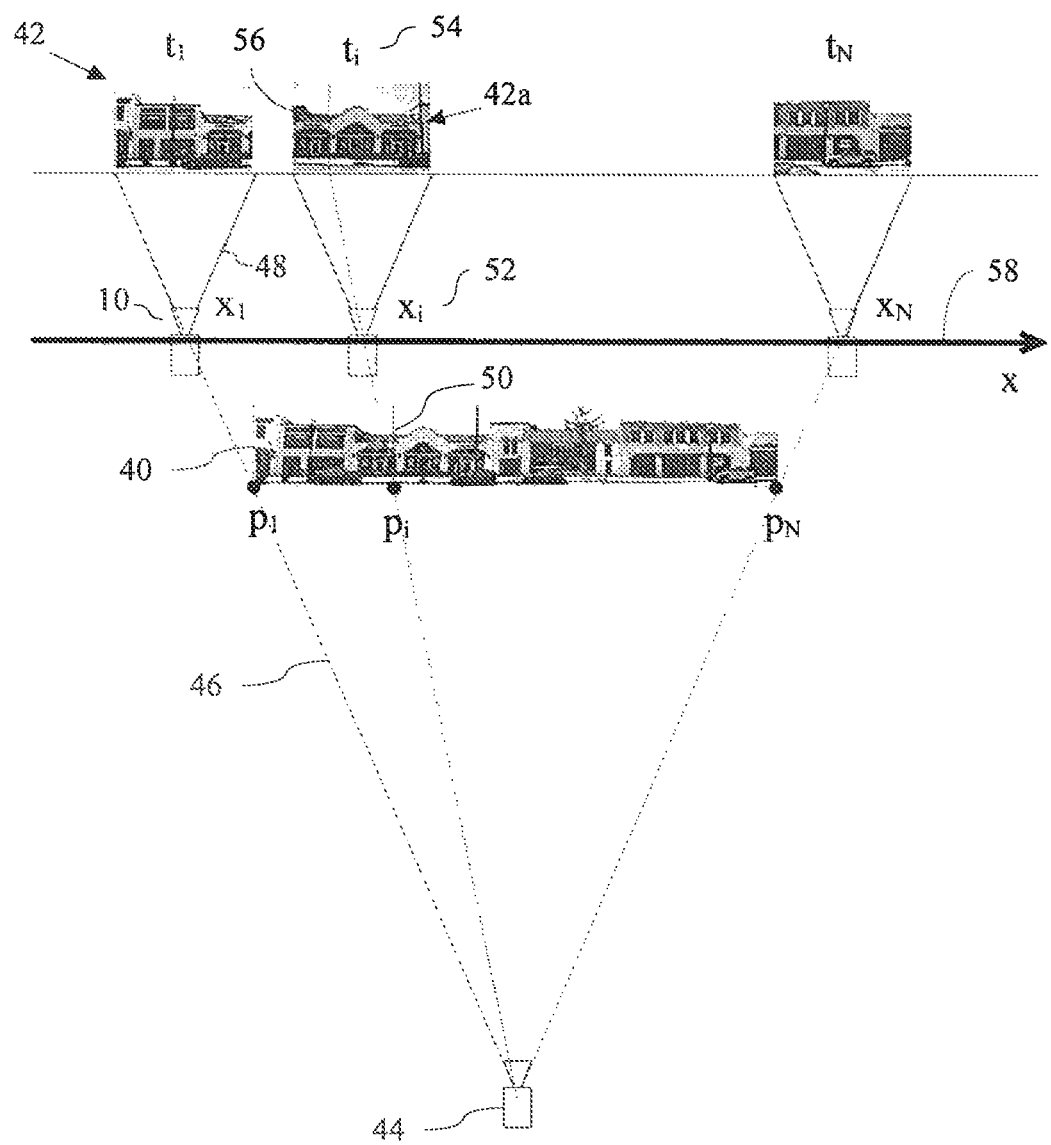
FIG. 2 is an illustration of a composite image created by the data acquisition and processing system of FIG. 1.

FIG. 2 is an illustration of a composite image 40 created from the image frames 42 acquired by the camera 10 while moving along an x-axis 58 direction. In creating the composite image 40, the computer assumes a fictitious camera 44 located behind the actual camera 10 and identifies optical rays 46 originating from the fictitious camera. The location of the fictitious camera 44 depends on the desired field of view of the location being filmed. The further away the fictitious camera is placed from the objects along the x-axis 58, the wider its field of view of the objects.

The computer also identifies optical rays 48 originating from the actual camera 10. For each optical ray 46 from the fictitious camera 44, the computer 28 selects an acquired image frame 42 that includes a corresponding optical ray 48 originating from the actual camera 10. Image data from each selected image frame 42 is then extracted and combined to form the composite image. Preferably, the image data extracted from each image frame is an optical column that consists of a vertical set of pixels. The composite image is preferably created on a column-by-column basis by extracting the corresponding optical column from each image frame. Thus, to create a column Pi 50 in the composite image 40, the computer locates an image frame 42a that was acquired when the camera 10 was located at Xi 52. To locate this image frame 42a, the computer uses the GPS data and/or data from the inertial navigation system 20 to identify a time Ti 54 at which the camera 10 was in the location Xi 52. Once the image frame 42a is identified, the computer 28 extracts the optical column 56 with an index (Pi/N)*M, where N is the total number of columns in the composite image 40 and M is the number of columns in the image frame 42a. The composite image 40 is stored in the image database 32, preferably in MEG format, and associated with an identifier identifying the particular geographic location depicted in the image. Furthermore, close-ups and fish-eye views of the objects are also extracted from the video sequences using well-known methods, and stored in the image database 32. The unused data from the acquired images is then preferably deleted from the computer's memory.

Figure 3:
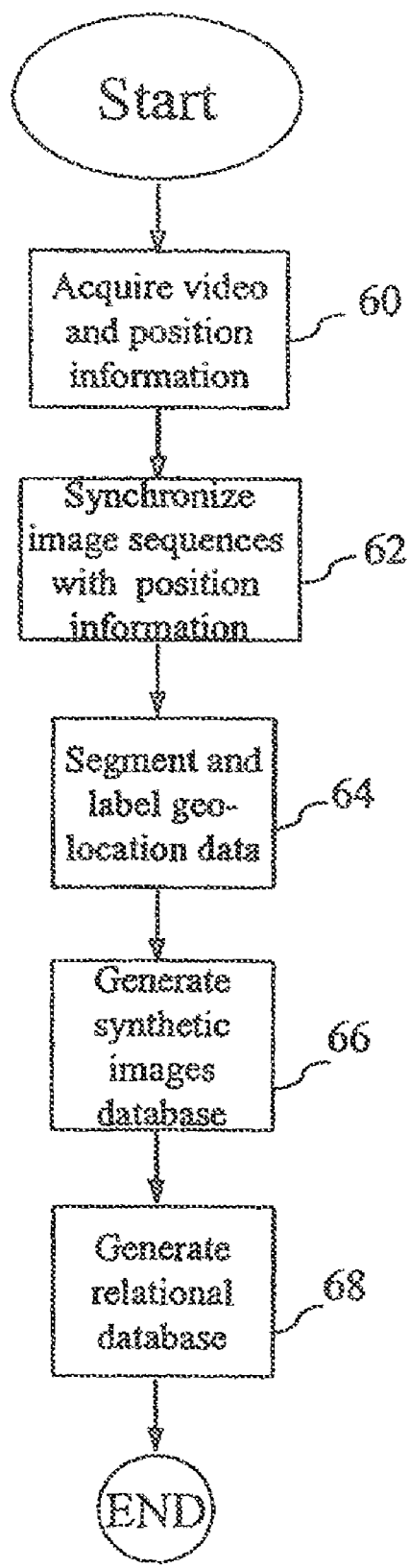
FIG. 3 is a high-level flow diagram of the steps exercised by the data acquisition and processing system of FIG. 1 in creating and storing the composite images.

FIG. 3 is a high-level flow diagram of the steps exercised by the data acquisition and processing system in creating and storing the composite images. In step 60, the camera 10 acquires a series of images of a particular geographic location. At the same time, the GPS receiver 16 and/or inertial navigation system 20 acquires the position of the camera 10 while the images are being acquired. Because the time associated with the position information (position likely to differ from the times of acquisition of the video images (video time), the computer 28, in step 62, synchronizes the image sequence with the position sequence. The synchronization is preferably a post-processing step that occurs after the image and position sequences have been acquired.

In step 64, the computer 28 segments the trajectory taken by the recording camera 10 into multiple segments and labels each segment with identifying information about the segment. For example, if the camera traverses through various streets, the computer 28 segments the trajectory into multiple straight street segments and associates each street segment with a street name and number range. In step 66, the computer 28 generates a series of composite images depicting a portion of each segment, and in step 68, stores each composite image in the image database 32 along with the identifying information of the segment with which it is associated.

Figure 4:
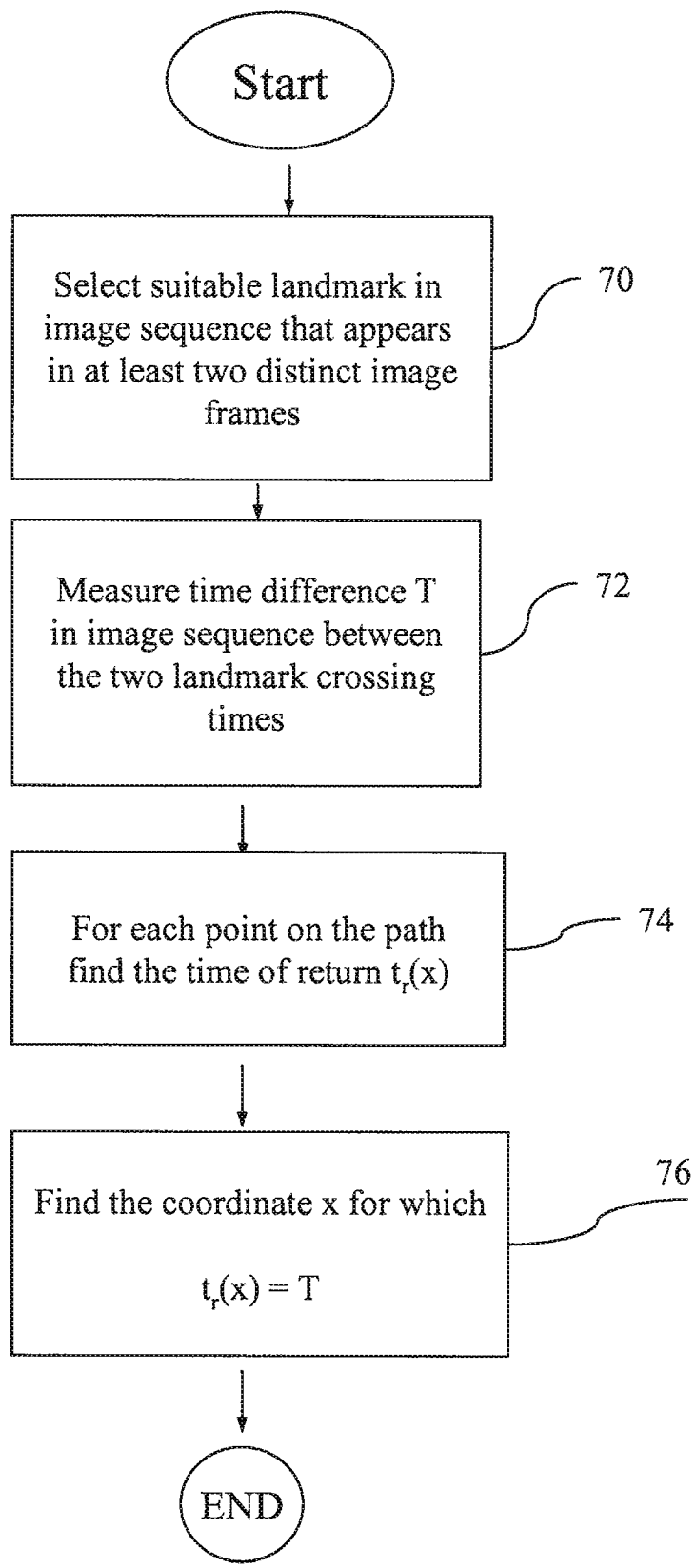
FIG. 4 is a flow diagram for synchronizing image sequences with position sequences of a recording camera according to one embodiment of the invention.

FIG. 4 is a more detailed flow diagram of step 62 for synchronizing the image sequences with the position sequences of the recording camera according to one embodiment of the invention. Although the process illustrated in FIG. 4 assumes that the position data is GPS data, a person skilled in the art should recognize that a similar process may be employed to synchronize the images to positions calculated using the inertial navigation system 20.

The process starts, and in step 70, a user of the system selects a landmark in the image sequence that appears in at least two distinct video frames. This indicates that the landmark was recorded once while the camera 10 was moving on one direction on the path, and again while the camera was moving in an opposite direction on the same path. The landmark may be, for example, a tree in a lane divider.

In step 72, a time interval T is measured in the image sequence between the two passings of the landmark. In step 74, the computer 28 uses the GPS data to compute a function for determining the time interval between successive passes of any point along the path. The function is then used to find, for each point x on the path, a time of return Tr(x) which measures the lapse of time between the two passings of each point. In step 76, a point is identified for which Tr(x)=T. The identified point provides the GPS position of the landmark and hence, a GPS time associated with the landmark. Given the GPS time, a difference between the GPS time and the video time associated with the landmark may be calculated for synchronizing any image frame acquired at a particular video time to the GPS position of the camera at a particular GPS time.

Figure 5:
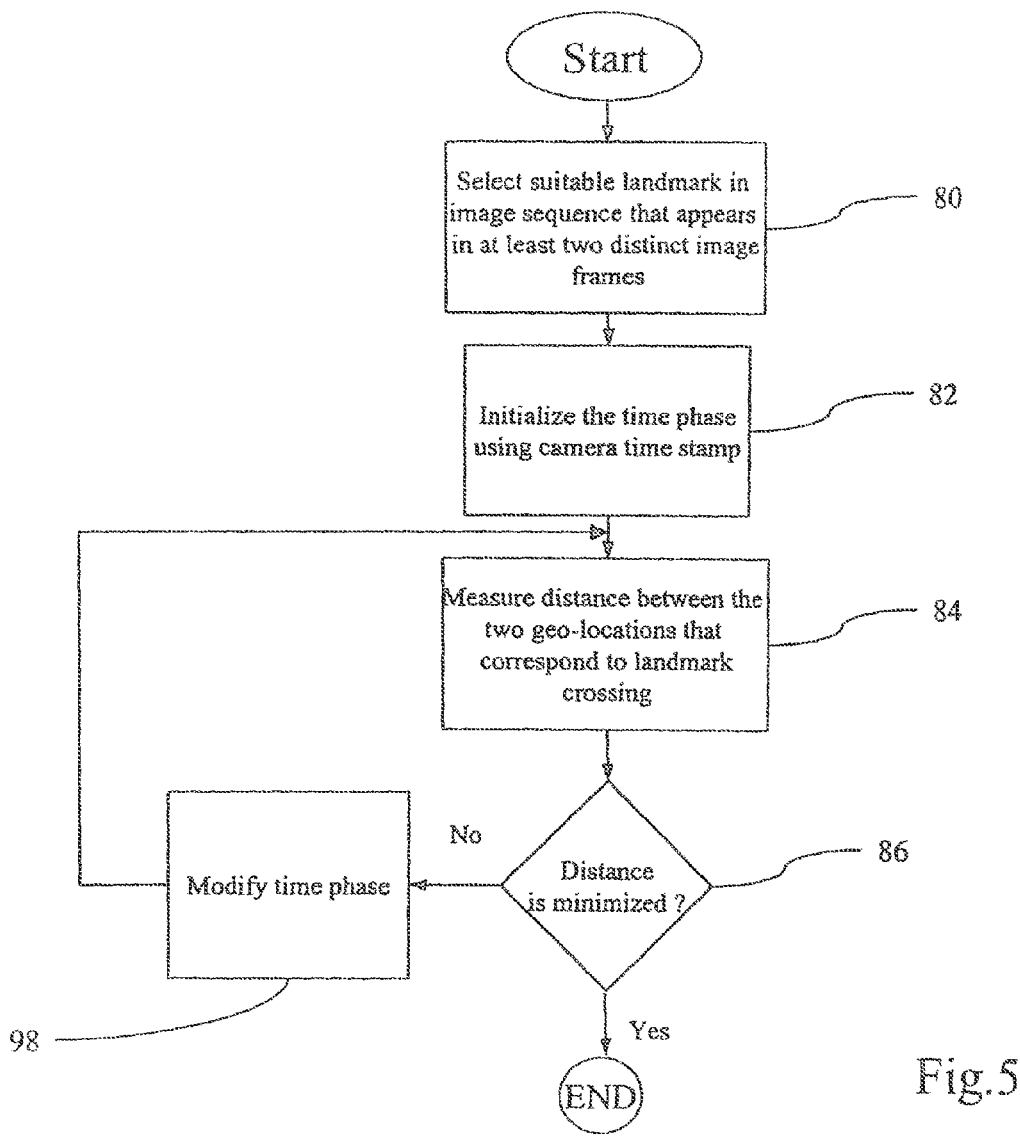
FIG. 5 is a flow diagram of an alternative embodiment for synchronizing image sequences with position sequences of a recording camera.

FIG. 5 is a flow diagram of an alternative embodiment for synchronizing the image sequences with GPS position information. As in FIG. 4, the process illustrated in FIG. 5 also identifies, in step 80, a landmark in the image sequence that appears in at least two distinct image frames. In step 82, a time phase is initialized to an arbitrary value using the camera time stamp. In step 84, the computer 28 measures the distance traveled between the two points on the path that correspond to the time instants in the image sequence where the landmark is seen from the two sides of the path. In step 86, an inquiry is made as to whether the distance has been minimized. If the answer is NO, the time phase is modified in step 88, and the process returns to step 84 where the distance is measured again.

Figure 6:
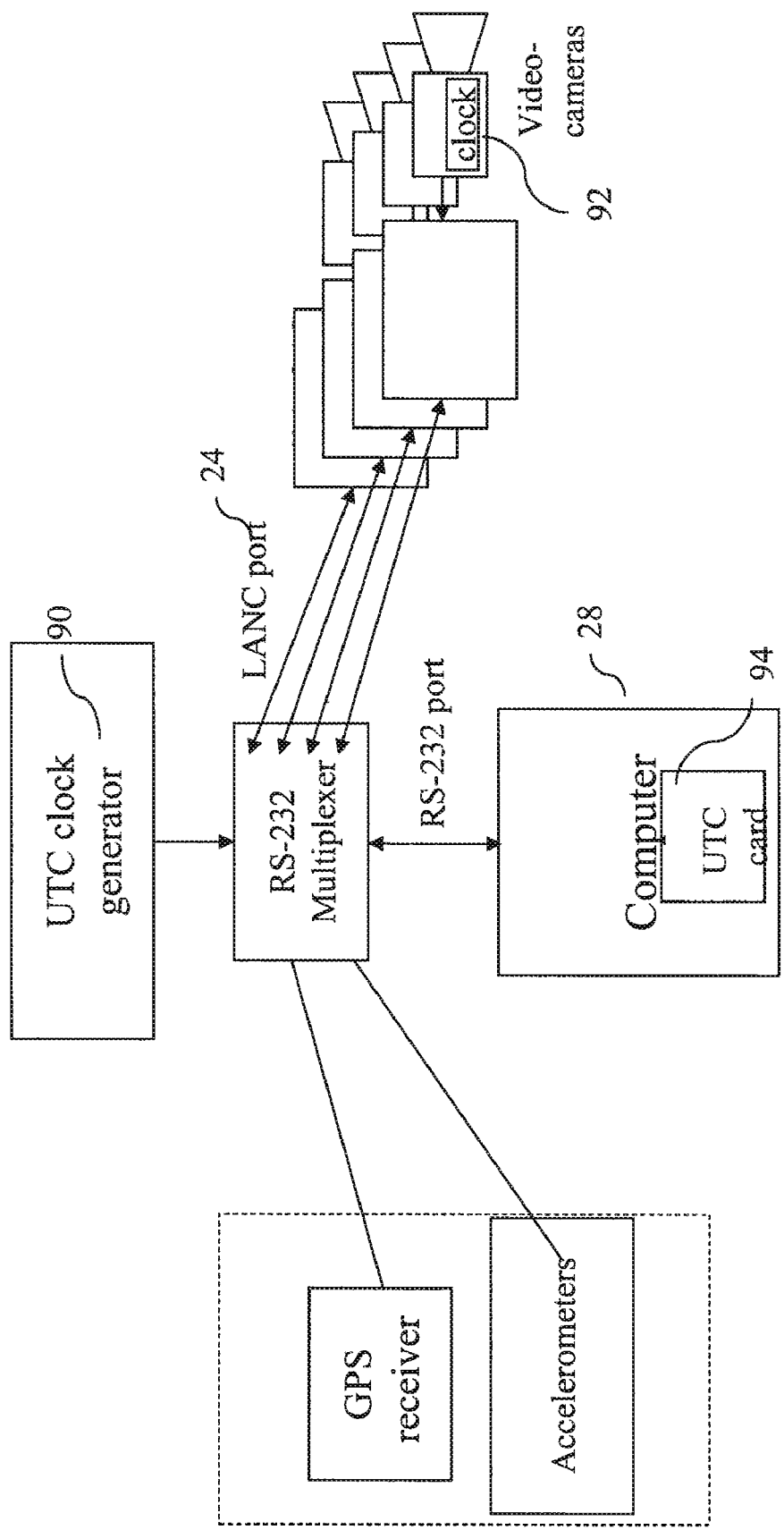
FIG. 6 is a block diagram of the data acquisition and processing system of FIG. 1 allowing a real-time synchronization of image and position data.

In another embodiment, the synchronization does not occur as a post-production process, but occurs in real-time as the image and position sequences are acquired. FIG. 6 is a block diagram of a portion of the data acquisition and processing system of FIG. 1 allowing a real-time synchronization of image and position data. A UTC clock generator 90 provides to the data acquisition computer 34 the UTC time associated with each GPS position of the recording camera 10 as the camera moves along the path. The video time produced by a camera clock 92 is also provided to the data acquisition computer 34 via the communications port 24. A UTC card 94 on the computer 34 correlates the video time to the UTC time. Thus, the video image acquired at the video time may be correlated to the GPS position of the camera during the recording of the image.

Figure 7:
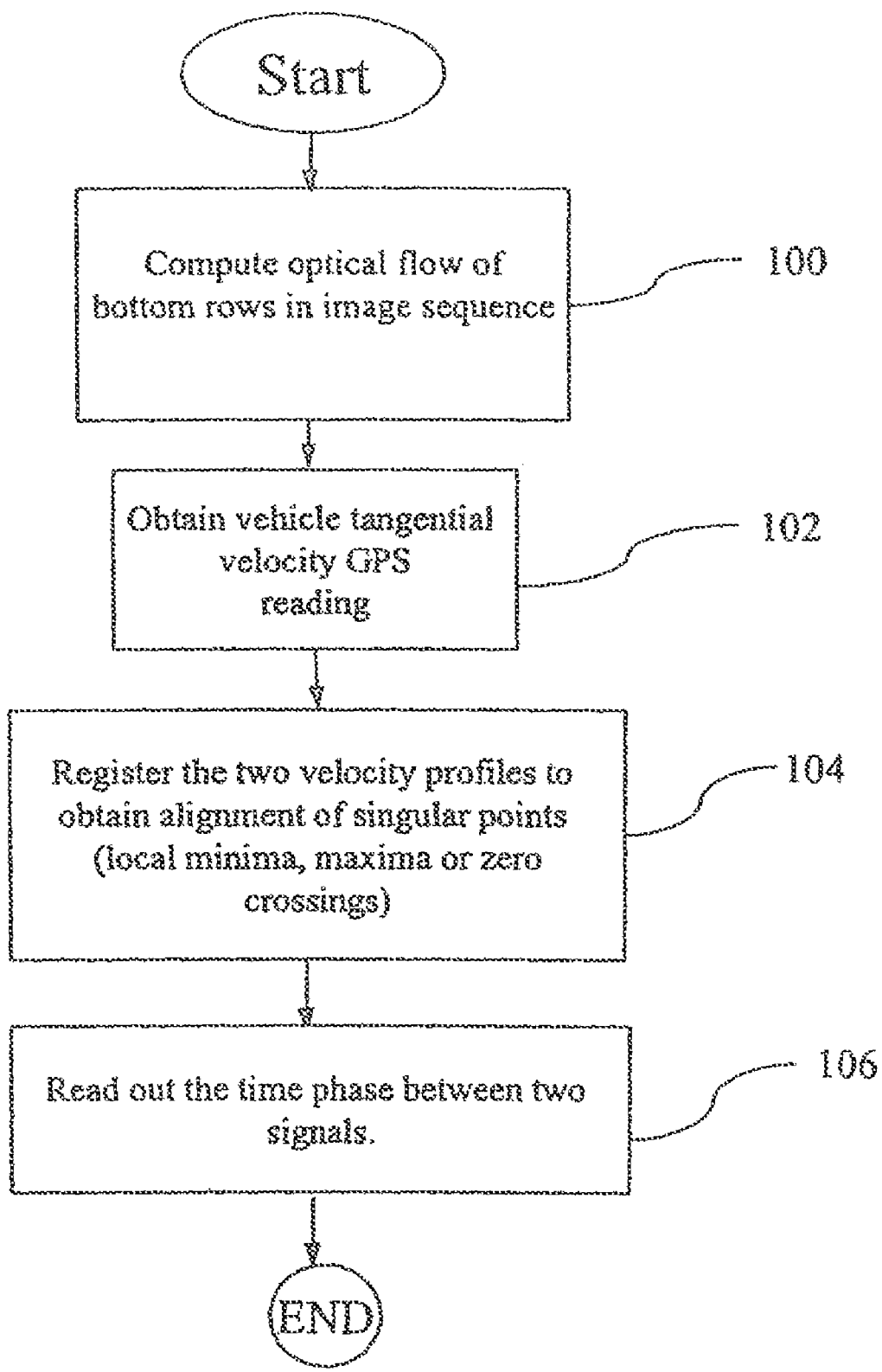
FIG. 7 is another embodiment for synchronizing image sequences with position sequences of a recording camera.

FIG. 7 is yet another embodiment for synchronizing the image sequences with the GPS position of the recording camera 10. In step 100, the post-processing computer 28 computes the temporal variation in the image values (i.e. optical flow) of the bottom pixel rows in the image sequence. Thus, the average velocity of each of the pixels in the row may be obtained. In step 102, the tangential velocity of the camera 10 is obtained from the GPS reading. The average velocity for the computed pixels is directly proportional to the vehicle tangential velocity. Thus, in step 104, the time phase between the position and video sequences may be determined as a time delay maximizing the alignment of local maxima and local minima between the average pixel velocity and the vehicle tangential velocity. This time phase is then read out in step 106.

Figure 8:
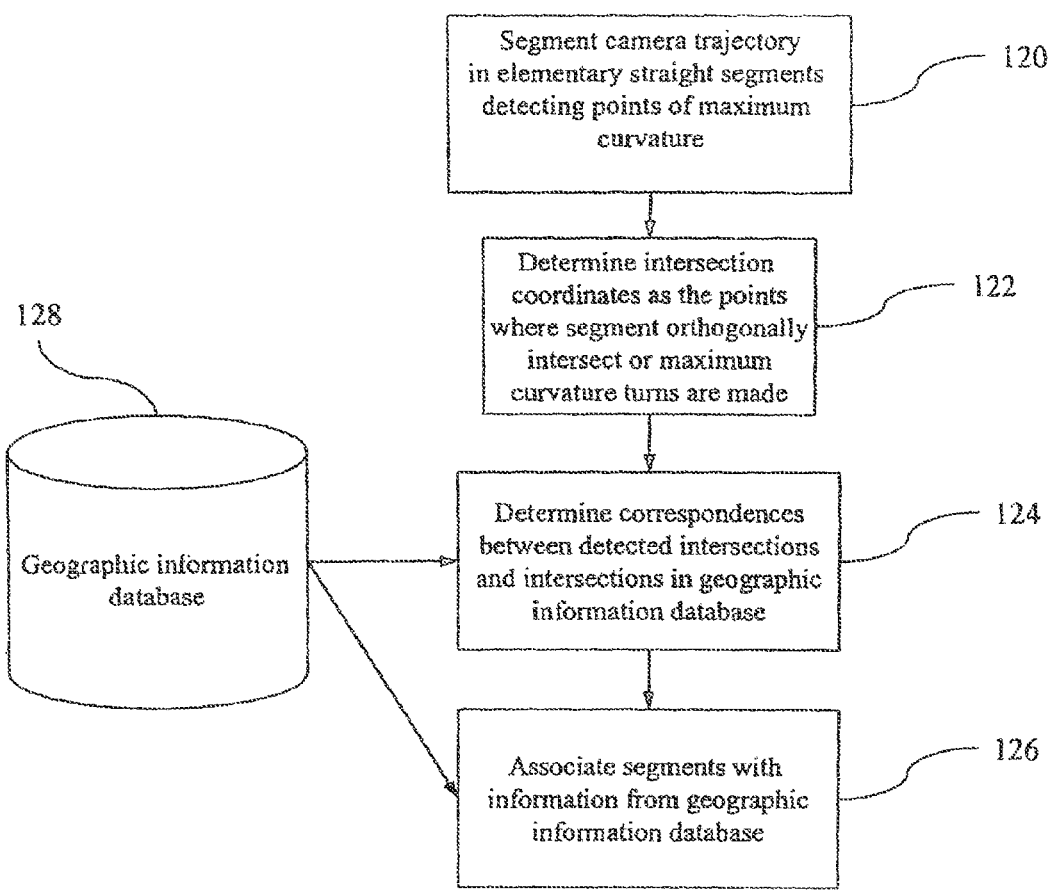
FIG. 8 is a flow diagram for segmenting and labeling a camera trajectory.
Figure 9:
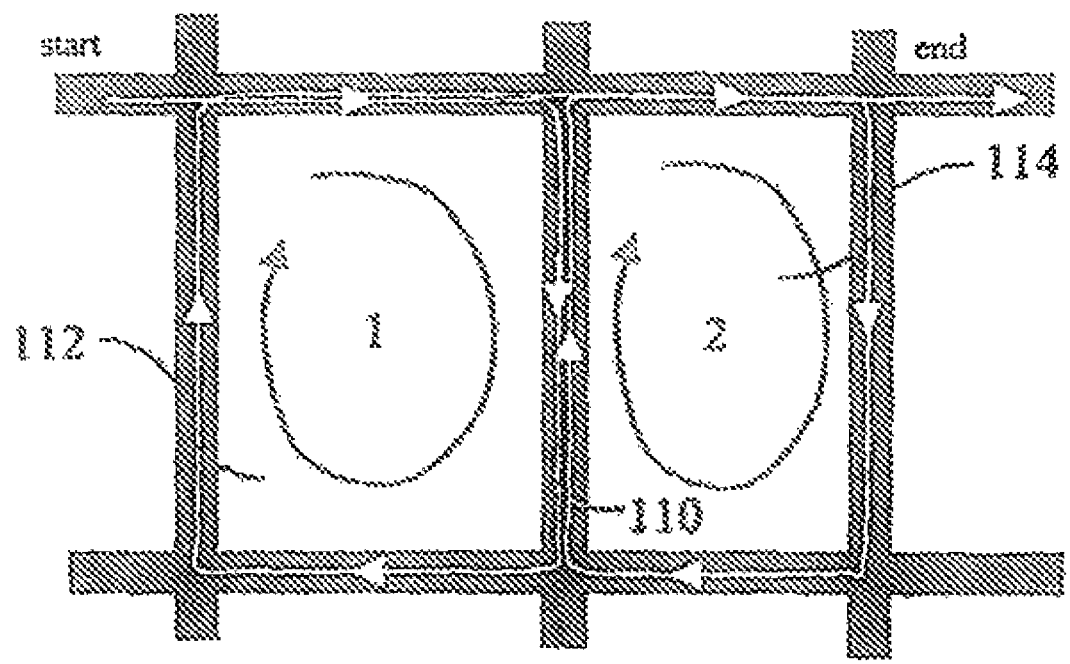
FIG. 9 is an illustration of a trajectory in a single camera scenario.

FIG. 8 is a more detailed flow diagram of step 64 of FIG. 3 for segmenting the trajectory followed by one or more recording cameras 10 and labeling the segments with an identifier. In the one camera scenario, the camera is moved along the path making a right turn at each intersection until a block 112 has been filmed, as is illustrated in FIG. 9. The camera then moves to a second block 114 to film the objects on that block. Thus, a particular path 110 adjoining the two blocks 112, 114 is traversed twice on opposite directions allowing the filming of the objects on each side of the path.

In step 120, the post-processing computer 28 segments the camera's trajectory into straight segments by detecting the points of maximum curvature (i.e. where the turns occur). In this regard, the latitude and longitude coordinates provided by the GPS receiver 16 are converted into two-dimensional Mercator coordinates according to well-known methods. A spline interpolation is then obtained from the two-dimensional Mercator coordinates and the resulting spline function is parameterized in arc-length. The computer 28 obtains a new sampling of the coordinates from the spline function by uniformly sampling the coordinates in an arc-length increment of about one meter while detecting the points in the new sequence where a turn was made. The place where a turn occurs is assumed to be the place of an intersection of two segments.

Preferably, the computer 28 performs a singular value decomposition computation according to well-known methods to detect the turns. In this regard, the computer selects an observation window containing N sample points that is moved along the spline for calculating an index indicative of the overall direction (i.e. alignment) of the points in the window. The higher the index, the less aligned the points, and the more likely that the camera was making a turn at those points. The points are least aligned at the center of a turn, and thus, the computer selects as a turn coordinate a point in the observation window where the index is at a local maximum. The computer 28 gathers all the points whose indexes correspond to local maxima and stores them into an array of turn coordinates.

In step 122, the computer 28 determines the center of an intersection by grouping the turn coordinates into clusters where turns that belong to the same cluster are turns made on the same intersection. An average of the turn coordinates belonging to the same cluster is then calculated and assigned as the intersection coordinate.

The endpoints of each straight segment are identified based on the calculated intersection coordinates. In this regard, an intersection coordinate at the start of the segment is identified and assigned to the segment as a segment start point (the "From" intersection coordinate). An intersection coordinate at the end of the segment is also identified and assigned to the segment as a segment end point (the "To" intersection coordinate).

In the scenario where at least two side cameras are utilized, each camera films the objects on each side of the path during the first pass on the path. Thus, unlike the single camera scenario where a turn is made at each intersection to move the camera along the same path twice but in opposite directions, a turn is not made at each intersection in the two camera scenario. Therefore, instead of identifying the points of maximum curvature for determining the intersection coordinates, the intersection coordinates are simply detected by tracking the GPS data and identifying where the segments orthogonally intersect.

The computer 28 associates the calculated segments with information obtained from a geographic information database 128 and stores it into a segments table as is described in further detail below. In the scenario where composite images of a city are created, the geographic information database 128 includes a map of the city where the endpoints of each street segment on the map are identified by latitude and longitude information. The database 128 further includes a street name and number range for each street segment on the map. Such databases are commercially available from third parties such as Navigation Technologies and Etak, Inc.

In correlating the segments of the camera's trajectory with the segments in the geographic information database 128, the computer, in step 124, determines the correspondences between the "From" and "To" coordinates calculated for the trajectory segment with intersection coordinates of the segments in the database. The computer 28 selects the segment in the geographic information database 128 which endpoints are closest to the computed "From" and "To" coordinates, as the corresponding segment.

In step 126, the computer labels each trajectory segment with information that is associated with the corresponding segment in the database 128. Thus, if each segment in the database 128 includes a street name and number, this information is also associated with the trajectory segment.

Figure 10:
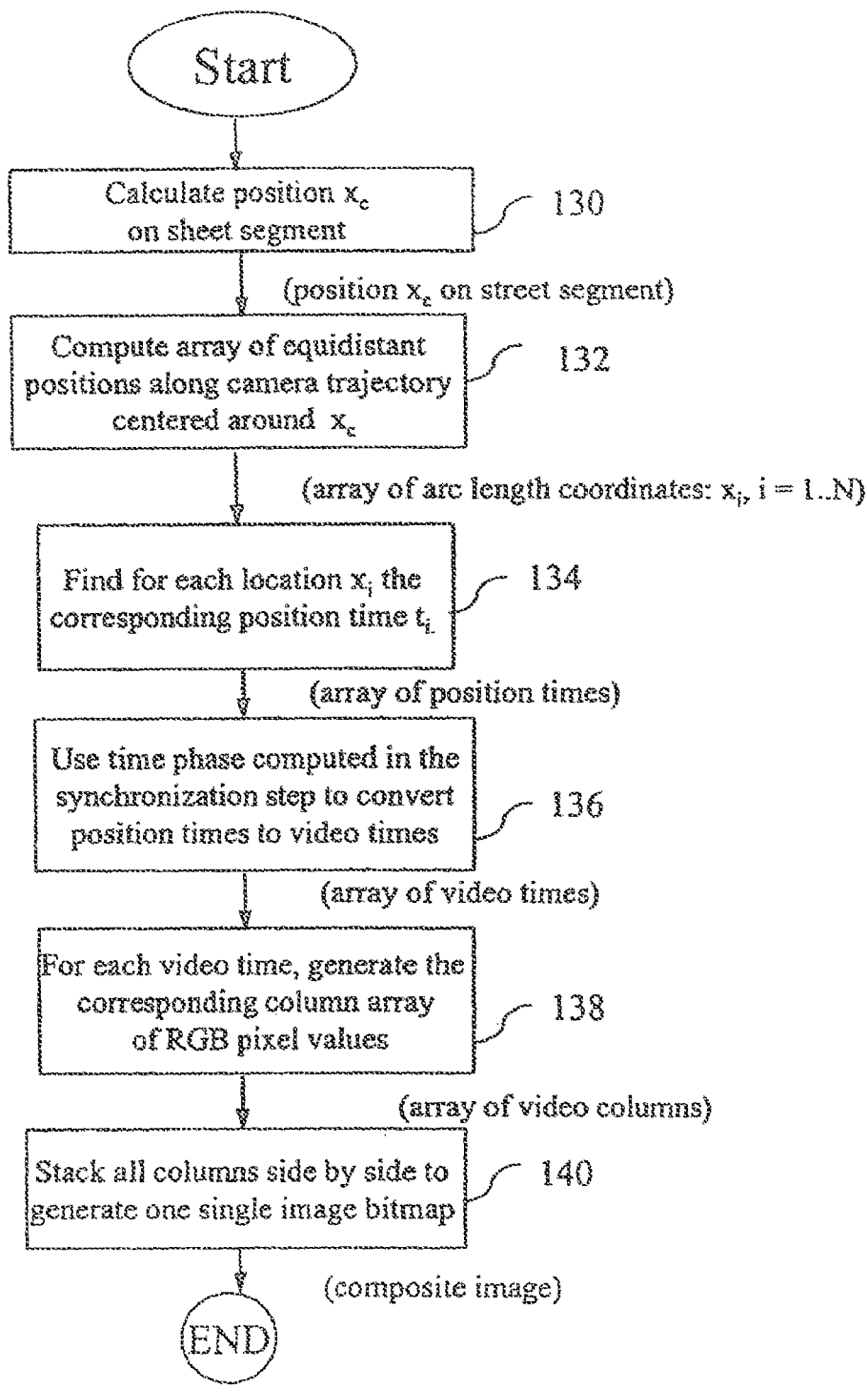
FIG. 10 is a flow diagram for creating a composite image of a segment of a camera's path.

FIG. 10 is a more detailed flow diagram of step 66 of FIG. 3 for creating a composite image of a segment of the camera's path according to one embodiment of the invention. In step 130, the computer 28 computes the arc length coordinate Xc of the center of the segment which is then set as the center of the composite image. In step 132, the computer identifies the optical rays 46 (FIG. 2) originating from the fictitious camera 44 by computing an array of equidistant positions X1, X2, ..., Xn along the camera's trajectory, centered around Xc. The number of computed positions preferably depend on the number of optical columns that are to be created in the composite image.

In step 134, the computer 28 uses the position information obtained from the GPS receiver 16 and/or inertial navigation system 20 to map each position Xi on the trajectory to a position time Ti. Thus, if GPS data is used to determine the camera's position, each position Xi of the camera 10 is mapped to a UTC time.

In step 136, the computer 28 uses the time phase information computed in the synchronization step 62 of FIG. 3 to convert the position times to video times. For each identified video time, the computer 28, in step 138, identifies an associated image frame and extracts a column of RGB pixel values from the frame corresponding to the optical rays 46 originating from the fictitious camera 44. In step 140, the column of RGB pixel values are stacked side by side to generate a single image bitmap forming the composite image.

Figure 11:
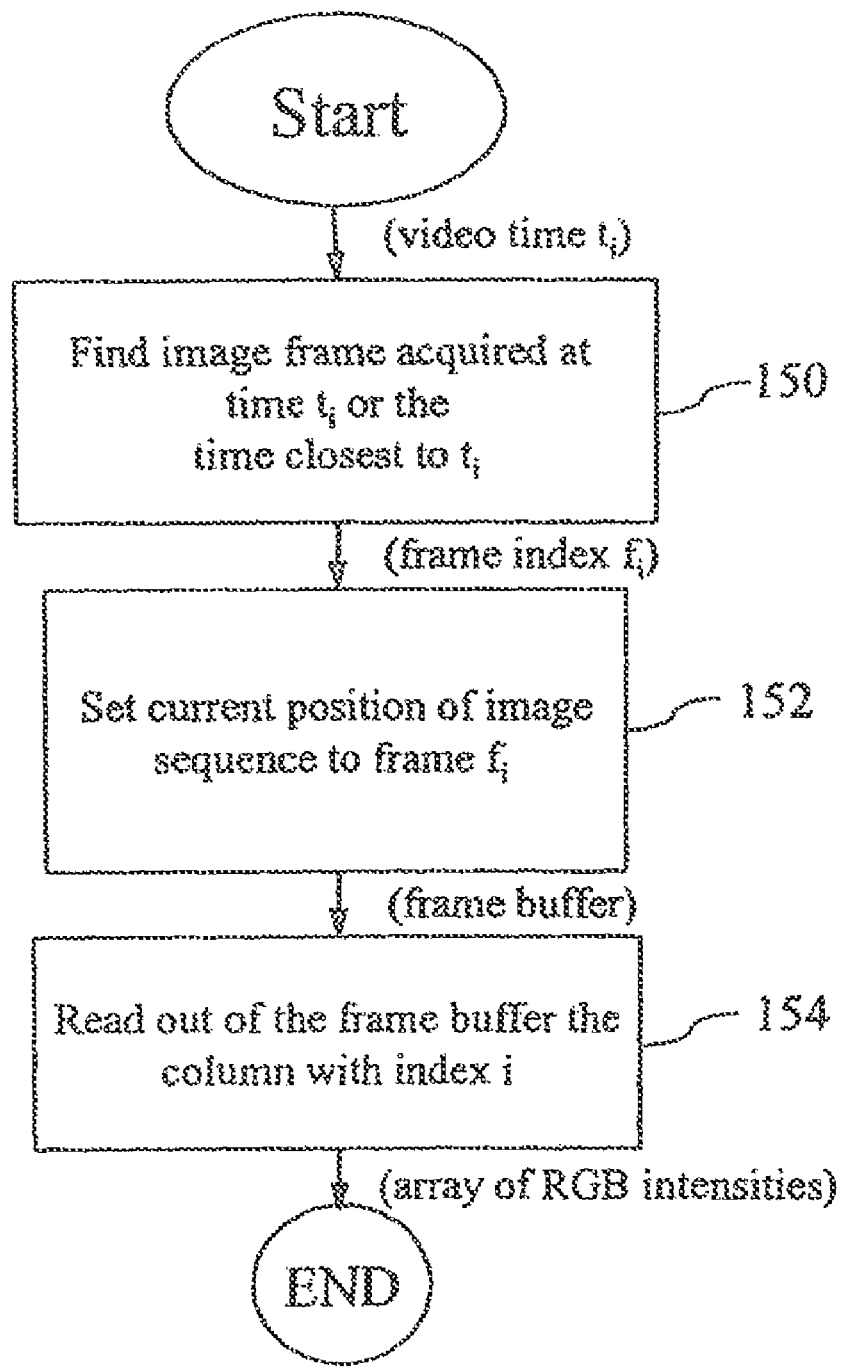
FIG. 11 is a flow diagram for identifying and retrieving an optical column from an acquired image according to one embodiment of the invention.

FIG. 11 is a more detailed flow diagram of step 138 for identifying and retrieving a column of RGB pixel values for a particular video time Ti according to one embodiment of the invention. In step 150, the computer 28 identifies an image frame with frame index Fi acquired at time Ti. Because the image frames are acquired at a particular frame rate (e.g. one frame every 1/30 seconds), there may be a particular time Ti for which an image frame was not acquired. In this scenario, the frame closest to time Ti is identified according to one embodiment of the invention.

In step 152, the current position of the image sequence is set to the image frame with index Fi, and the frame is placed into a frame buffer. In step 154, a column in the image frame with an index i is read out from the frame buffer.

Figure 12:
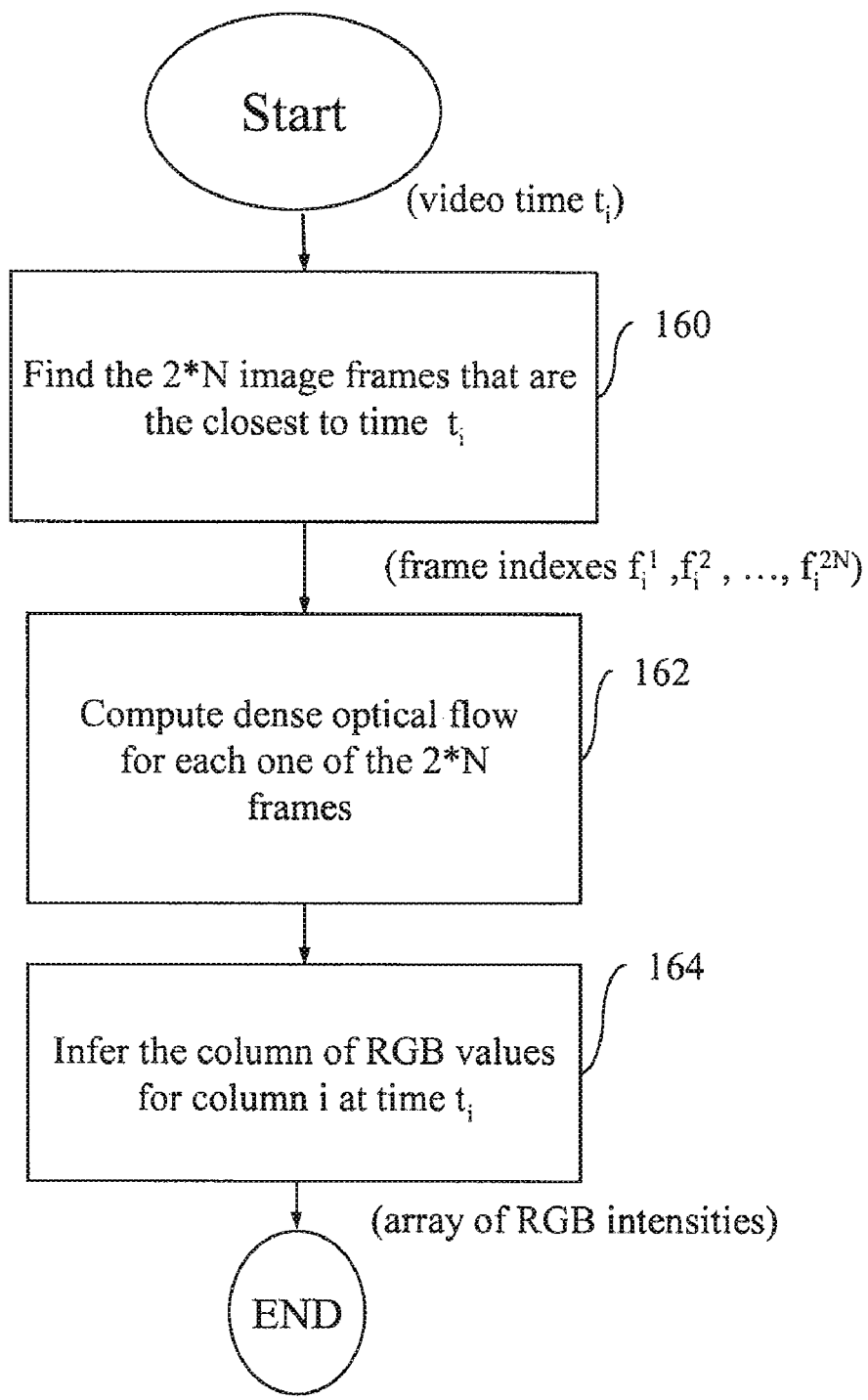
FIG. 12 is a flow diagram for identifying and retrieving an optical column from an acquired image according to an alternative embodiment of the invention.

FIG. 12 is a flow diagram of an alternative embodiment for identifying and retrieving a column of RGB pixel values for a particular video time Ti. If an image frame was not acquired at exactly time Ti, the computer, in step 160, identifies 2*N image frames that are closest to time Ti, where N>1. Thus, at least two image frames closest to time Ti are identified. In step 162, the computer computes an optical flow field for each of the 2*N image frames and in step 164, infers the column of RGB values for a column i at time Ti. In the situation where only two image frames are used to compute the optical flow, the computer identifies for each pixel in the first image frame a position X1 and a position time T1. A corresponding pixel in the second frame is also identified along with a position X2 and a position time T2. The position X' of each pixel at time Ti is then computed where X'=X1+((Ti−T1)/(T2−T1))*(X2−X1). Given the position of each pixel at time Ti, a new frame that corresponds to time Ti may be inferred. The computer 28 may then extract the column of RGB values from the new frame for a column i.

Preferably, the computer 28 creates multiple composite images at uniform increments (e.g. every 8 meters) along a segment. In the scenario where the composite images are created for street segments, the composite images depict the view of the objects on each side of the street. The composite images are then stored in the image database 28 along with various tables that help organize and associate the composite images with street segment information.

According to one embodiment of the invention, the image database 32 includes composite images of a geographic area which together provide a visual representation of at least the static objects in the entire area. Thus, if the geographic area is a particular city, the composite images depict the city on a street-by-street basis, providing a visual image of the buildings, stores, apartments, parks, and other objects on the streets. The system further includes an object information database with information about the objects being depicted in the composite images. If the geographic area being depicted is a city, the object information database contains information about the structures and businesses on each city street. In this scenario, each record in the object information database is preferably indexed by a city address.

FIG. 13 is an illustration of an exemplary street segments table 170 including the street segments in the camera's trajectory. The table 170 suitably includes multiple entries where each entry is a record specific to a particular street segment. A particular street segment record includes an index identifying the street segment (segment ID) 172 as well as the corresponding street name 174 obtained from the geographic information database 128 (FIG. 12). A particular street segment record also includes the direction of the street (North, South, East, or West) 176 with respect to a main city street referred to as a city hub. The direction information generally appears in an address in front of the street name. A city, state, and/or country fields may also be added to the table 170 depending on the extent of the geographic area covered in the image database 32.

A street segment record includes the endpoint coordinates 178 of the corresponding street segment in the geographic information database 128. An array of segment IDs corresponding to street segments adjacent to the segment start point are identified and stored in field 180 along with the direction in which they lie with respect to the start point (e.g. North, South, East, or West). Similarly, an array of segment IDs corresponding to street segments adjacent to the segment end point are also identified and stored in field 182. These segments are also ordered along the direction in which they lie.

In addition to the above, a street segment record includes a distance of the start of the trajectory segment from the city hub 184. The city hub generally marks the origin of the streets from which street numbers and street directions (North, South, East, or West) are determined. Street numbers are generally increased by two at uniform distances (e.g. every 12.5 feet) starting from the hub. Thus the distance from the hub allows a computation of the street numbers on the street segment. In a one camera situation where each segment is traversed twice, the distance from the hub is computed for each camera trajectory. In a multiple camera scenario, however, only one distance is computed since the camera traverses the segment only once.

Also included in a street segment record is a length of the trajectory segment. Such a length is computed for each trajectory in a one camera 10 scenario because the movement of the camera 10 is not identical during the two traversals of the segment.

Each street segment record 170 further includes an offset value 188 for each side of the street. The offset is used to correct the street numberings computed based on the distance information. Such a computation may not be accurate if, for instance, there is an unusually wide structure on the segment that is erroneously assigned multiple street numbers because it overlaps into the area of the next number assignment. In this case, the offset is used to decrease the street numbers on the segment by the offset value.

FIG. 14 is an illustration of an exemplary image coordinates table 200 for associating the composite images with the street segments in the street segments table 170. The image coordinates table 200 includes a plurality of composite image records where each record includes a segment ID 202 of the street segment being depicted in the composite image. In addition, each composite image record includes information of the side of the street segment 204 being depicted. For example, the side may be described as even or odd based on the street numbers on the side of the street being depicted. Each composite image entry also includes a distance from the segment origin to the center Xc of the composite image 206 indicating the position along the street segment for which the image was computed. The distance information is used to retrieve an appropriate composite image for each position on the street segment.

FIG. 15 is an illustration of an exemplary segment block table 210 for allowing an efficient determination of a segment ID that is closest to a particular geographic coordinate. In this regard, the geographic area depicted in the image database 32 is preferably partitioned into a grid of square blocks where each block includes a certain number of street segments. The blocks are assigned block labels preferably corresponding to the center longitude and latitude coordinates of the block. The block labels are stored in a block label field 212. Associated with each block label are segment IDs 214 corresponding to the street segments in the block. Given the coordinates of a particular geographic location, the block closest to the given coordinates may be identified to limit the search of street segments to only street segments within the block.

In a particular use of the system, a user places inquiries about a location in a geographic area depicted in the image database 32. For example, the user may enter an address of the location, enter the geographic coordinates of the location, select the location on a map of the geographic area, or specify a displacement from a current location. Preferably, the user has access to a remote terminal that communicates with a host computer to service the user requests. The host computer includes a processor programmed with instructions to access the image database 32 in response to a user request and retrieve composite images about the particular location. The processor is also programmed with instructions to access the geographic and object information databases to retrieve maps and information on the businesses in the geographic area. The retrieved data is then transmitted to the requesting remote user terminal for display thereon.

The remote user terminals may include personal computers, set-top boxes, portable communication devices such as personal digital assistants, and the like. The visual component of each remote user terminal preferably includes a VGA or SVGA liquid-crystal-display (LC) screen, an LED display screen, or any other suitable display apparatus. Pressure sensitive (touch screen) technology may be incorporated into the display screen so that the user may interact with the remote user terminal by merely touching certain portions of the screen. Alternatively, a keyboard, keypad, joystick, mouse, and/or remote control unit is provided to define the user terminal's input apparatus.

Each remote user terminal includes a network interface for communicating with the host computer via wired or wireless media. Preferably, the communication between the remote user terminals and the host computer occurs over a wide area network such as the Internet.

In an alternative embodiment of the invention, the image, geographic information, and object information databases reside locally at the user terminals in a CD, DVD, hard disk drive, or any other type of mass storage media. In this embodiment, the user terminals include a processor programmed with instructions to receive queries from the user about a particular geographic location and retrieve composite images and associated information in response to the user queries.

Figure 16:
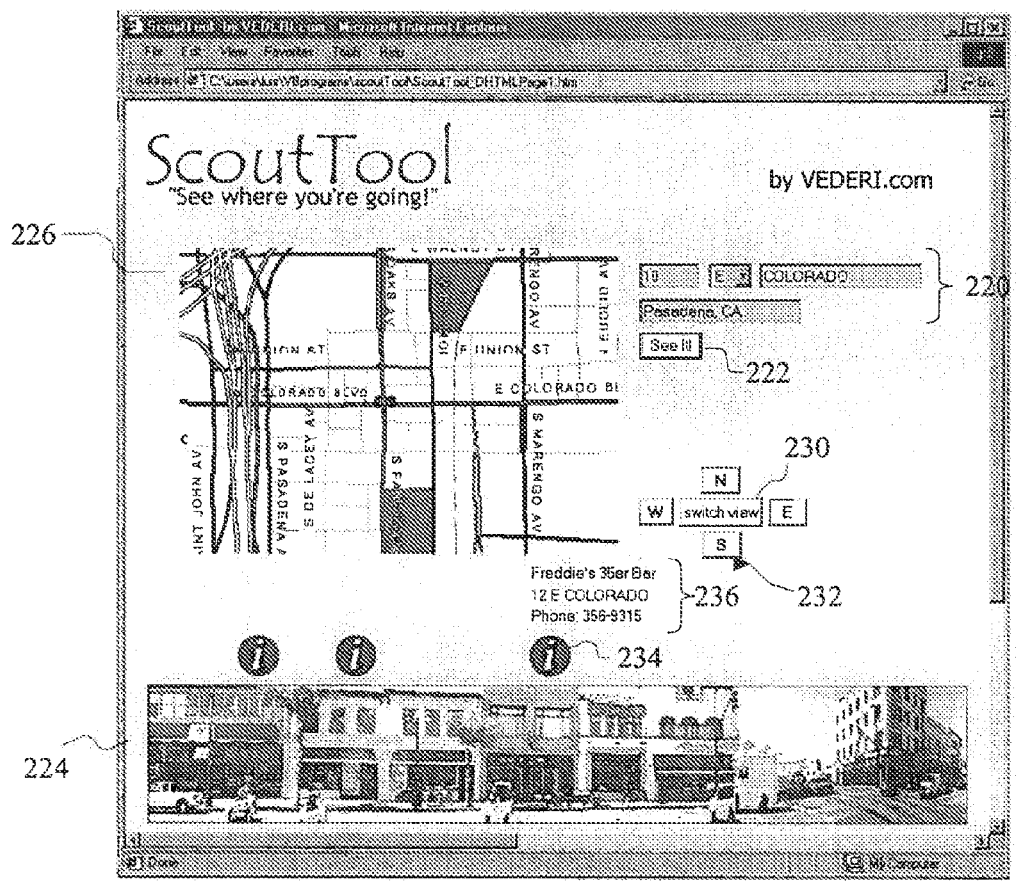
FIG. 16 is an illustration of an exemplary graphical user interface for allowing the user to place requests and receive information about particular geographic locations.

FIG. 16 is an illustration of an exemplary graphical user interface (GUI) for allowing the user to place requests and receive information about particular geographic locations. The GUI includes address input fields 220 allowing the user to enter the street number, street name, city and state of the particular location he or she desires to view. Actuation of a "See It" button 222 causes the user terminal to transmit the address to the host computer to search the image and geographic location databases 32, 128 for the composite image and map corresponding to the address. Furthermore, the host computer searches the object information database to retrieve information about the objects depicted in the composite image.

The retrieved composite image and map are respectively displayed on the display screen of the requesting user terminal in a map area 226 and an image area 224. The map is preferably centered around the requested address and includes a current location cursor 228 placed on a position corresponding to the address. The current location identifier 228 may, for instance, take the shape of an automobile.

The composite image displayed on the image area 224 provides a view of a side of the street (even or odd) based on the entered street number. The user may obtain information about the objects being visualized in the composite image by actuating one of the information icons 234 above the image of a particular object. In displaying the information icons 234, a range of street addresses for the currently displayed image is computed. The listings in the object information database with street numbers that fall inside the computed range are then selected and associated with the information icons 234 displayed on top of the image of the object.

If the objects are business establishments, the information displayed upon actuating the information icons 234 may include the name, address, and phone number 236 of the establishment. This information is preferably displayed each time the user terminal's cursor or pointing device is passed above the icon. In addition, if the establishment is associated with a particular Web page, the information icon 234 functions as a hyperlink for retrieving and displaying the Web page, preferably on a separate browser window.

The user may obtain a close-up view of a particular object in the composite image by selecting the object in the image. A close-up view of the object is then obtained by computing the distance of the selected object from the origin of the street segment where they object lies. The location on the segment of the closest close-up image is computed and retrieved from the image database 32. The close-up image is then provided in the image area 224 or in a separate browser window.

A "Switch View" button 230 allows the user to update the current composite image providing a view of one side of the street with a composite image of the other side of the street. In a multiple camera scenario, each actuation of the "Switch View" button 230 provides a different view of the street. The current view is preferably identified by a direction identifier (not shown) on or close to the current location identifier 228. For instance, one side of the current location identifier 228 may be marked with a dot or an "X" to identify the side of the street being viewed. Alternatively, an arrow may be placed near the current location identifier 228 to identify the current viewing direction.

The composite image is also updated as the user navigates through the streets using the navigation buttons 232. From a current location, the user may choose to navigate north, south, west, and east by actuating the corresponding buttons. Preferably, only the navigation buttons corresponding to the possible direction of motions from the current position are enabled. As the user actuates one of the buttons, the current position is incremented by a predetermined amount, currently set to eight meters, to the next available composite image on the current or adjacent segment. The image area 224 is then updated with the new composite image.

Figure 17:
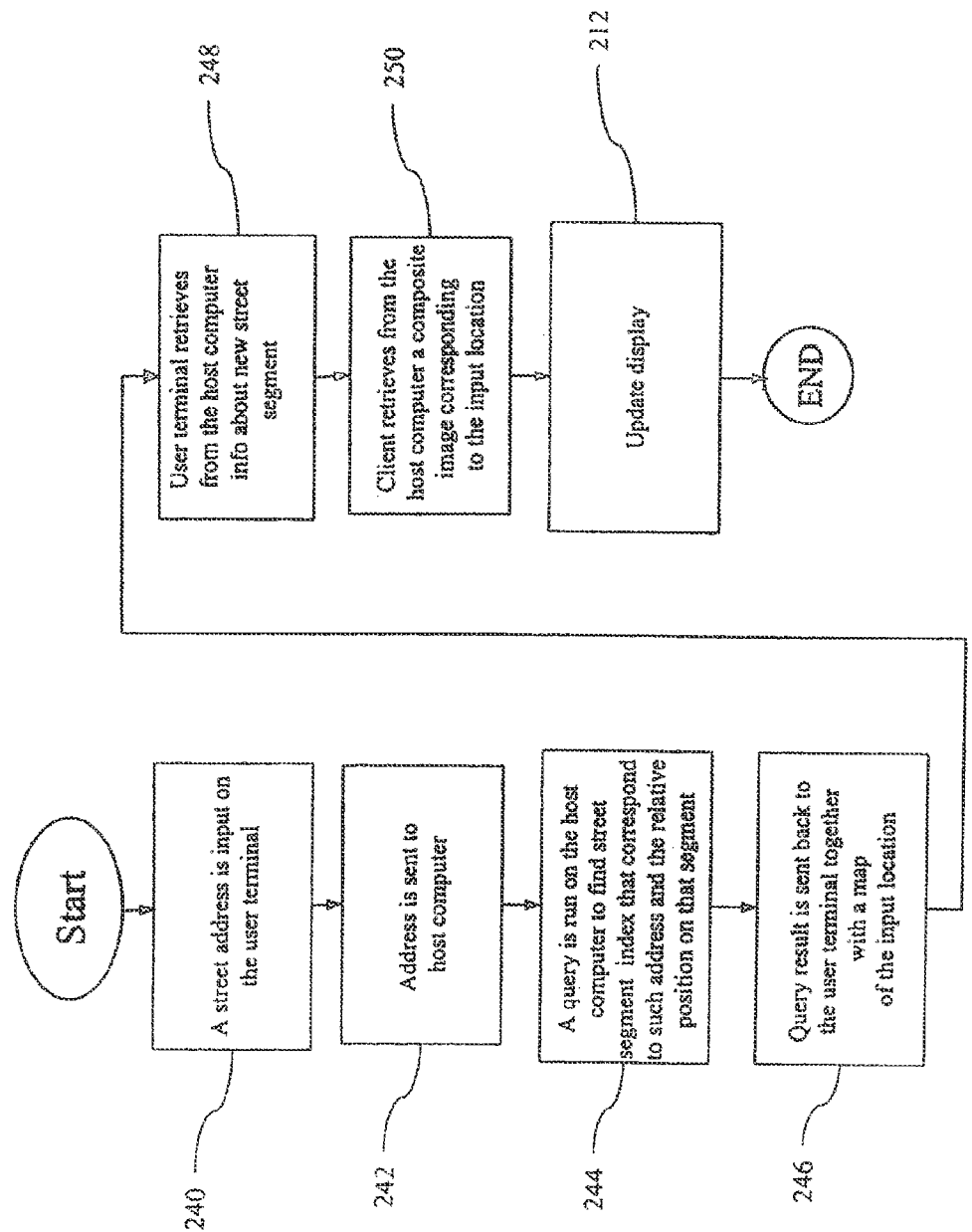
FIG. 17 is a flow diagram of a process for obtaining image and location information of an express street address.

FIG. 17 is a flow diagram of the process executed by the host computer for obtaining image and location information of an express street address entered in the address input fields 220. A similar process is executed by the user terminal in the embodiment where the location and image information are stored locally at the user terminal.

The process starts, and in step 240, the user requests information about a particular street address by entering the address in the address input fields 220. In step 242, the address is transmitted to the host computer preferably over a wide area network such as the Internet. In step 244, a query is run on the host computer to locate the street segment index in the street segment table 170 (FIG. 13) corresponding to the requested address. In this regard, the computer searches the street segment table 170 for street segments that match the desired street name 174 as well as a city, state, or country if applicable. For each street segment matching the street name, the computer computes the starting street number on that segment preferably based on the following formula:

$$\text{Start Number} = (\text{round}((\text{Distance from Hub} + \text{Offset})/K)*2)$$

The distance from the hub 184 and offset 188 values are obtained from the street segment table 170. The value K is the distance assumed between any two street numbers on the segment.

The ending street number on the street segment is also calculated using a similar formula:

$$\text{End Number} = (\text{round}((\text{Distance from Hub} + \text{Offset} + \text{length})/K)*2)$$

The length is the length 186 value obtained from the street segment table 170.

Once the start and end street numbers are calculated for a particular street segment, the computer determines whether the requested street number lies within the start and end street numbers. If it does, the computer returns the corresponding segment ID 172. Furthermore, the computer determines the distance of the requested street number from the start of the street segment for determining the position of the street number on the street segment.

In step 246, the host computer transmits the query result to the requesting user terminal along with a map of the input location retrieved from the geographic information database 128. In step 248, the requesting user terminal downloads from the host computer a record from the street segments table 170 corresponding to the identified street segment. Furthermore, the user terminal also retrieves the computed start and end street numbers of the street segment, a list of computed composite images for both sides of the street segment in the image coordinates table 200 (FIG. 14), and information of the objects visible on the street segment in the object information database.

In step 250, the user terminal downloads a composite image for the appropriate side of the street from the host computer that has a distance from the origin of the street segment to the center of the composite image 206 (FIG. 14) that is closest to the distance of the desired street number from the origin. The display on the user terminal is then updated in step 252 with the new location and image information.

Figure 18:
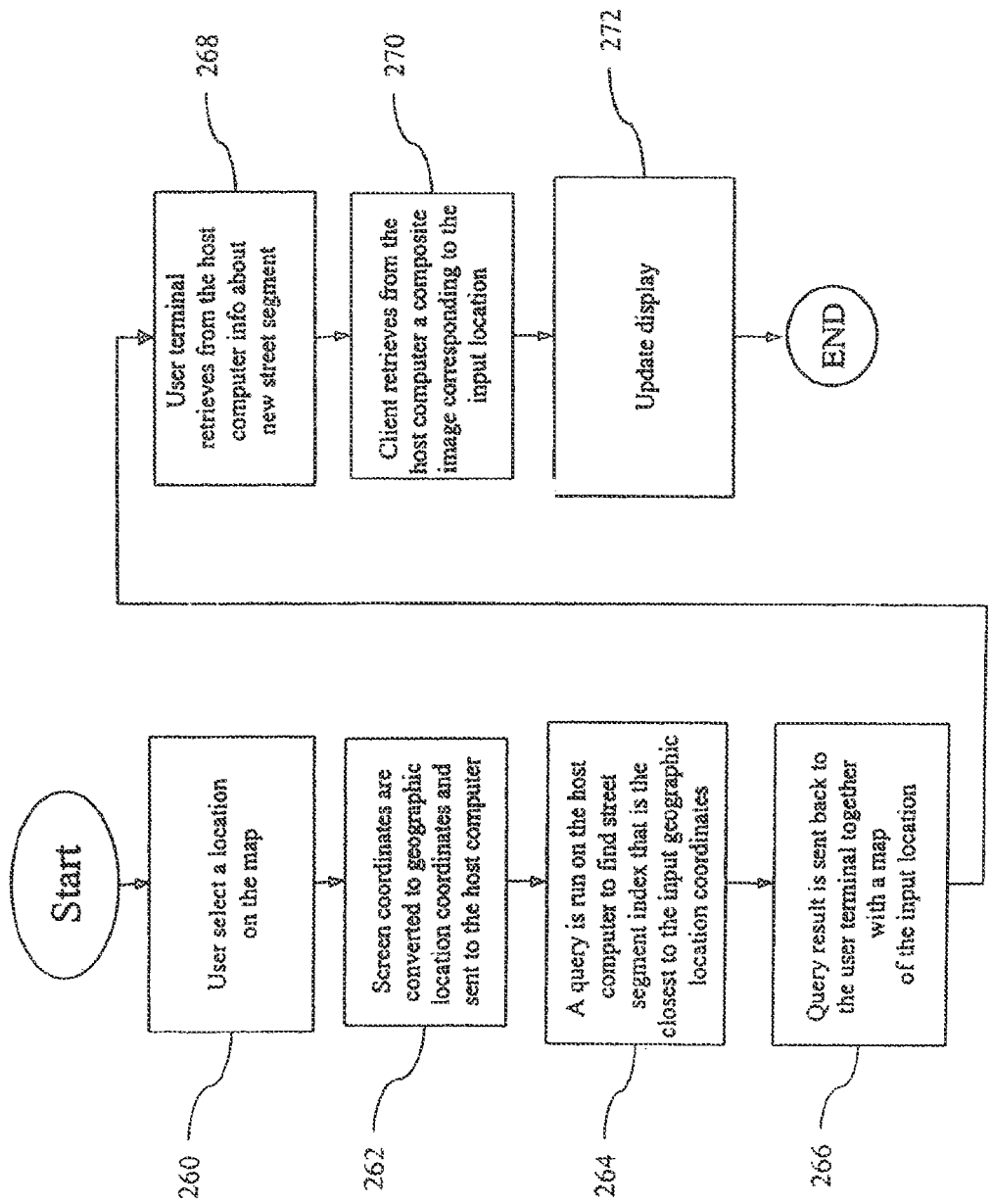
FIG. 18 is a flow diagram of the process for obtaining image and location information of a location selected from a map.

FIG. 18 is a flow diagram of the process executed by the host computer for obtaining image and location information of a particular location selected on the map displayed in the map area 226. A similar process is executed by the user terminal in the embodiment where the location and image information are stored locally at the user terminal.

The process starts, and in step 260, the user requests information about a particular street address by selecting a location on the map. In step 262, the map coordinates are converted from screen coordinates to geographic location coordinates (x,y) and transmitted to the host computer preferably over the Internet. In step 244, a query is run on the host computer to locate the street segment index in the street segment table 170 (FIG. 13) corresponding to the geographic location coordinates. In this regard, the computer searches the segment block table 210 (FIG. 15) for a block that includes the street segment corresponding to the input location. In order to locate such a block, the computer rounds the identified geographic location coordinates based preferably on the size of the block. The rounded (x,y) coordinates may thus be represented by $((\text{round}(x/B))*B, (\text{round } y/B)*B))$, where B is the length of one of the block sides. The computer then compares the rounded number to the coordinates stored in the block label field 212 and selects the block with the label field 212 equal to the rounded coordinate. Once the appropriate block is identified, the computer proceeds to retrieve the segment IDs 214 associated with the block. The geographic coordinates of the desired location are then compared with the endpoint coordinates of each street segment in the block for selecting the closest street segment.

In step 266, the segment ID of the closest street segment is returned to the user terminal. Additionally, a new map of the desired location may be transmitted if the previous map was not centered on the desired location.

In step 268, the requesting user terminal downloads from the host computer a street segment record in the street segments table 170 corresponding to the identified street segment. The user terminal also retrieves the calculated start and end street numbers of the street segment, a list of computed composite images for both sides of the street the segment in the image coordinates table 200 (FIG. 14), and information of the objects visible on the street segment in the object information database.

In step 270, the user terminal downloads the composite image corresponding to the geographic coordinates of the input location. To achieve this, the geographic coordinates are converted to a distance along the identified street segment. The user terminal downloads a composite image that has a distance from the origin of the street segment to the center of the composite image 206 (FIG. 14) that is closest to the distance of the input location from the origin. The display on the user terminal is then updated in step 272 with the new location and image information.

Although this invention has been described in certain specific embodiments, those skilled in the art will have no difficulty devising variations which in no way depart from the scope and spirit of the present invention. For example, the composite images may be made into streaming video by computing the composite images at small increments along the path (e.g. every 30 cm). Furthermore, the composite images may be computed at several resolutions by moving the fictitious camera 44 (FIG. 2) closer or further away from the path to decrease or increase its field of view and provide the user with different zoom levels of the image.

Variation may also be made to correct any distortions in the perspective of the composite image along the vertical y-axis direction. The extraction of the optical columns from the acquired image frames may introduce such a distortion since the sampling technique used along the horizontal x-axis direction is not applied along the y-axis. Such a distortion may be corrected by estimating the depth of each pixel in the composite image using optical flow. The aspect ratio of each pixel may be adjusted based on the distance of the object visualized in the pixel. The distortion may also be corrected by acquiring images from an array of two or more video cameras 10 arranged along the vertical y-axis in addition to the cameras in the horizontal axis.

The described method of generating composite images also relies on an assumption that the camera's trajectory is along a straight line. If this is not the case and the vehicle carrying the camera makes a lane change, makes a turn, or passes over a bump, the choice of the optical column extracted from a particular image frame may be incorrect. The distortion due to such deviations from a straight trajectory may, however, be corrected to some degree using optical flow to detect such situations and compensate for their effect.

It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. In a system including an image source and a portable communication device having a screen, a method for enabling visual navigation of a geographic area from the portable communication device, the method comprising:
   receiving a first user input specifying a first location in the geographic area;
   retrieving from the image source a first image associated with the first location, the image source providing a plurality of images depicting views of objects in the geographic area, the views being substantially elevations of the objects in the geographic area, wherein each image is a commposite image generated based on image frames acquired by an image recording device moving along a trajectory;
   displaying on the screen a direction identifier for indicating the viewing direction depicted in the first image;
   receiving a second user input specifying a navigation direction relative to the first location in the geographic area;
   determining a second location based on the user specified navigation direction; and
   retrieving from the image source a second image associated with the second location.

2. The method of claim 1 further comprising:
   displaying the second image on the screen at a first zoom level;
   receiving a third user input; and
   in response to the third user input, displaying one or more objects in the second image at a second zoom level different than the first zoom level.

3. The method of claim 2, wherein the second zoom level provides a closer view of the one or more objects in the second image than the first zoom level.

4. The method of claim 2, wherein an image resolution at the second zoom level is greater than the image resolution at the first zoom level.

5. The method of claim 2, wherein the third user input is selection of an object in the second image.

6. The method of claim 2, wherein the second image at the first zoom level is displayed on a first display area of the screen, and the one or more objects at the second zoom level are displayed on a second display area of the screen.

7. The method of claim 2, wherein the image source stores a plurality of images at a plurality of zoom levels, the method further comprising:
   retrieving from the image source an image associated with the second zoom level including the one or more objects in response to the third user input.

8. The method of claim 1, wherein the portable communication device is a personal digital assistant.

9. The method of claim 1 further comprising:
   displaying the first image on the screen of the portable communication device; and
   updating the first image with the second image.

* * * * *